United States Patent
Zeng

(10) Patent No.: US 10,127,079 B2
(45) Date of Patent: *Nov. 13, 2018

(54) SCHEDULING USER REQUESTS IN A DISTRIBUTED RESOURCE SYSTEM HAVING PLURALITY OF SCHEDULERS AND COORDINATORS

(71) Applicant: HUAWEI TECHNOLOGIES CO., LTD., Shenzhen, Guangdong (CN)

(72) Inventor: Huarong Zeng, Shenzhen (CN)

(73) Assignee: HUAWEI TECHNOLOGIES CO., LTD., Shenzhen (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,643

(22) Filed: Dec. 27, 2016

(65) Prior Publication Data

US 2017/0109200 A1 Apr. 20, 2017

Related U.S. Application Data

(63) Continuation of application No. 14/932,628, filed on Nov. 4, 2015, now Pat. No. 9,575,691, which is a (Continued)

(51) Int. Cl.
*G06F 9/48* (2006.01)
*G06F 9/50* (2006.01)

(52) U.S. Cl.
CPC .......... *G06F 9/4881* (2013.01); *G06F 9/5005* (2013.01)

(58) Field of Classification Search
CPC .................. G06F 9/4881; G06F 9/5005
See application file for complete search history.

(56) References Cited

U.S. PATENT DOCUMENTS 6,434,631 B1 8/2002 Bruno et al.
6,480,861 B1 * 11/2002 Kanevsky ............... G06F 9/50
(Continued)

FOREIGN PATENT DOCUMENTS

CN 103973594 A 8/2014

OTHER PUBLICATIONS

Zhang, Yu et al., "DifferCloudStor: Differentiated Quality of Service for Cloud Storage," APMRC, 2012 Digest. IEEE, Oct. 2012. Total 9 pages.

(Continued)

*Primary Examiner* — Benjamin C Wu
(74) *Attorney, Agent, or Firm* — Gregg L. Jansen

(57) ABSTRACT

According to a method for scheduling a user request in a distributed resource system, an apparatus, and a system that are provided by embodiments of the present invention, in a $T_{n+1}$ period, an $S_d$ acquires, from a coordinator $G_k$ of a user z, a resource $C_z(T_n)$ that is consumed by a user z request in a $T_n$ period, and the $S_d$ schedules, according to $\phi_z$, $C_z(T_n)$, $C_{z,d}(T_n)$, and $N_{z,d}(T_n)$, a $P^i_{z,d}$ by using a scheduling algorithm. The user z request can be scheduled without depending on a user agent. In addition, the $S_d$ schedules, according to $\phi_z$, $C_z(T_n)$, $C_{z,d}(T_n)$, and $N_{z,d}(T_n)$, the $P^i_{z,d}$ by using the scheduling algorithm, thereby implementing global scheduling on the user z request and ensuring a performance requirement of the user z.

3 Claims, 8 Drawing Sheets

---

In a $T_{n+1}$ period, a scheduler A acquires, from a home coordinator A of a user A, a resource $C_A(T_n)$ that is consumed by a user A request in a $T_n$ period, and acquires, from a home coordinator B of a user B, a resource $C_B(T_n)$ that is consumed by a user B request in the $T_n$ period — 401

The scheduler A schedules, according to $\phi$ A, $C_A(T_n)$, $C_{A,A}(T_n)$, and $N_{A,A}(T_n)$, the received user A request by using a scheduling algorithm; and the scheduler A schedules, according to $\phi$ B, $C_B(T_n)$, $C_{B,A}(T_n)$, and $N_{B,A}(T_n)$, the received user B request by using the scheduling algorithm — 402

Related U.S. Application Data continuation of application No. PCT/CN2014/095381, filed on Dec. 29, 2014.

(56) References Cited

U.S. PATENT DOCUMENTS

| | | | |
|---|---|---|---|
| 6,519,595 | B1 | 2/2003 | Rose |
| 6,747,976 | B1 | 6/2004 | Bensaou et al. |
| 6,888,842 | B1 | 5/2005 | Kirkby et al. |
| 6,909,691 | B1 | 6/2005 | Goyal et al. |
| 7,665,090 | B1 * | 2/2010 | Tormasov ............ G06F 9/4881 718/104 |
| 7,697,844 | B2 | 4/2010 | Guo et al. |
| 7,761,875 | B2 | 7/2010 | Karamanolis et al. |
| 7,823,154 | B2 | 10/2010 | Wang et al. |
| 8,165,033 | B1 | 4/2012 | Zhang |
| 8,392,633 | B2 | 3/2013 | Gulati et al. |
| 8,819,687 | B2 | 8/2014 | Chung et al. |
| 2003/0050954 | A1 | 3/2003 | Tayyar et al. |
| 2004/0114602 | A1 | 6/2004 | Ko et al. |
| 2005/0147103 | A1 | 7/2005 | Yang et al. |
| 2006/0280119 | A1 | 12/2006 | Karamanolis et al. |
| 2007/0064711 | A1 | 3/2007 | Wang et al. |
| 2011/0055479 | A1 | 3/2011 | West et al. |
| 2011/0276972 | A1 | 11/2011 | Chung et al. |
| 2013/0044755 | A1 | 2/2013 | Liu et al. |
| 2015/0324230 | A1 | 11/2015 | Xu et al. |

OTHER PUBLICATIONS

Dong, Rongsheng et al. "On the Fault-tolerance Model of object-based, Distributed Real-Time System," Computer Engineering and Applications 7 (2004): 018, total 5 pages. Abstract in English. English Abstract Only.

Zhang, Fan et al. "Research on Schedule Algorithm for Packet Switching Networks—SFQ+," Computer Engineering 4 (2007): 026, English Translation attached. total 12 pages.

Pawan Goyal et al., "Start-time Fair Queuing: A Scheduling Algorithm for Integrated Services Packet Switching Networks," Technical Report TR-96-02, Dept. of Computer Sciences, Univ. Texas at Austin. 1996. XP002404038, total 28 pages.

Eman Elghoneimy et al., "Resource allocation and scheduling in cloud computing," Computing, Networking and Communications (ICNC) 2012 Intl. Conference on IEEE, Jan. 30, 2012. English abstract. XP032130688, total 2 pages. English Abstract Only.

* cited by examiner

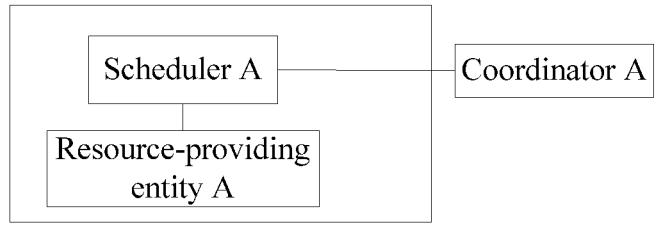

FIG. 3B

In a $T_{n+1}$ period, a scheduler A acquires, from a home coordinator A of a user A, a resource $C_A(T_n)$ that is consumed by a user A request in a $T_n$ period, and acquires, from a home coordinator B of a user B, a resource $C_B(T_n)$ that is consumed by a user B request in the $T_n$ period ⟶ 401

The scheduler A schedules, according to $ϕ A$, $C_A(T_n)$, $C_{A,A}(T_n)$, and $N_{A,A}(T_n)$, the received user A request by using a scheduling algorithm; and the scheduler A schedules, according to $ϕ B$, $C_B(T_n)$, $C_{B,A}(T_n)$, and $N_{B,A}(T_n)$, the received user B request by using the scheduling algorithm ⟶ 402

SCHEDULING USER REQUESTS IN A DISTRIBUTED RESOURCE SYSTEM HAVING PLURALITY OF SCHEDULERS AND COORDINATORS

CROSS-REFERENCE TO RELATED APPLICATIONS

This application is a continuation of U.S. Ser. No. 14/932,628, filed on Nov. 4, 2015, now allowed, which is a continuation of International Application No. PCT/CN2014/095381,filed on Dec. 29, 2014, both of which are hereby incorporated by reference in their entireties.

TECHNICAL FIELD

The present invention relates to the information technology field, and in particular, to a method for scheduling a user request in a distributed resource system, and an apparatus.

BACKGROUND

There are multiple resource-providing entities in a distributed resource system. Resources include a computing capability of a Central Processing Unit (CPU), hard disk space, memory space, network bandwidth, and the like, where a resource may be a physical resource or a virtual resource. When a resource-providing entity provides a resource according to a user request, a resource competition occurs between users. Therefore, scheduling a user request to ensure performance for users becomes extremely important.

FIG. 1 shows a user request scheduling solution, where a distributed resource system shown in FIG. 1 is a distributed file system and includes a user agent A, a user agent B, a scheduler A, a scheduler B, a resource-providing entity A, and a resource-providing entity B, where the user agent A does not communicate with the user agent B. The user agent A queries a metadata server in the distributed file system according to a user A request, and the user agent A determines, according to information obtained by querying, a scheduler in FIG. 1 to which the user A request is sent. Likewise, the user agent B queries the metadata server in the distributed file system according to a user B request, and the user agent B determines, according to information obtained by querying, a scheduler in FIG. 1 to which the user B request is sent. The resource-providing entity A and the resource-providing entity B are file systems. The resource-providing entity A is configured to provide a resource A, where the resource A is specifically a capability of providing Input/Output Operations Per Second (IOPS). The resource-providing entity B is configured to provide a resource B, where the resource B is specifically a capability of providing IOPS. A user A and a user B each send a request to the distributed resource system. For example, the user A sends a user A request to each of the resource-providing entity A and the resource-providing entity B by using the user agent A; then, the resource-providing entity A provides the resource A for the user A request, and the resource-providing entity B provides the resource B for the user A request. The user B sends a user B request to each of the resource-providing entity A and the resource-providing entity B by using the user agent B, and the resource-providing entity A and the resource-providing entity B provide the resources for the user B request. When the user A sends the user A request to each of the resource-providing entity A and the resource-providing entity B, in an implementation manner in FIG. 1, the resources provided by the resource-providing entity A and the resource-providing entity B for the user A are both IOPS capabilities. Likewise, the resources provided by the resource-providing entity A and the resource-providing entity B for the user B are also IOPS capabilities.

In the distributed resource system shown in FIG. 1, a resource weight is allocated to each of the user A and the user B. For example, a resource weight of the user A is 2, and a resource weight of the user B is 1. A resource weight of a user indicates a resource quota that is allocated by a distributed resource system to the user. The user agent A collects statistics on a quantity of user A requests that are sent by the user A to the scheduler A and the scheduler B, and the user agent B collects statistics on a quantity of user B requests that are sent by the user B to the scheduler A and the scheduler B. The scheduler A allocates, from the resource-providing entity A, a resource for the user A request according to a resource weight of the user A and the quantity of the user A requests that are sent by the user agent A to the scheduler A and the scheduler B. The scheduler A allocates, from the resource-providing entity A, a resource for the user B request according to a resource weight of the user B and the quantity of the user B requests that are sent by the user agent B to the scheduler A and the scheduler B. Likewise, the scheduler B allocates, from the resource-providing entity B, a resource for the user A request according to the resource weight of the user A and the quantity of the user A requests that are sent by the user agent A to the scheduler A and the scheduler B. The scheduler B allocates, from the resource-providing entity B, a resource for the user B request according to the resource weight of the user B and the quantity of the user B requests that are sent by the user agent B to the scheduler A and the scheduler B.

Because the user agent A and the user agent B are applicable only to a distributed file system scenario, the solution in an architecture shown in FIG. 1 cannot be widely applied to a scenario in which a user request is scheduled in a distributed resource system.

SUMMARY

According to a first aspect, an embodiment of the present invention provides a method for scheduling a user request in a distributed resource system, where the distributed resource system includes schedulers $S_x$, resource-providing entities $R_x$, and a coordinator $G_y$, where x is any one of consecutive natural numbers from 1 to M, and M≥2; y is any one of consecutive natural numbers from 1 to Y, and Y is a natural number; the $S_x$ communicates with the $R_x$; the $G_y$ communicates with any $S_x$; and the method includes:

acquiring, by an $S_d$ in a $T_{n+1}$ period and from a coordinator $G_k$ of a user z, a resource $C_z(T_n)$ that is consumed by a user z request in a $T_n$ period, where $$C_z(T_n) = \sum_{x=1}^{M} C_{z,x}(T_n);$$

d and k are natural numbers, 1≤d≤M, and 1≤k≤Y; a resource weight of the user z is $\phi_z$; $C_{z,x}(T_n)$ is a quantity of resources that are provided by the $R_x$ and consumed by $N_{z,x}(T_n)$ user z requests received by the $S_x$ in the $T_n$ period; and z indicates an identifier of the user; and scheduling, by the $S_d$ according to $\phi_z$, $C_z(T_n)$, $C_{z,d}(T_n)$, and $N_{z,d}(T_n)$, a $P^i_{z,d}$ by using a scheduling algorithm, where the $P^i_{z,d}$ is the $i^{th}$ user z request received by the $S_d$, and $C_{z,d}(T_n)$ is a quantity of resources that are provided by an $R_d$ and consumed by $N_{z,d}(T_n)$ user z requests received by the $S_d$ in the $T_n$ period.

With reference to the first aspect of the embodiment of the present invention, in a first possible implementation manner, the scheduling, by the $S_d$ according to $\phi_z$, $C_z(T_n)$, $C_{z,d}(T_n)$, and $N_{z,d}(T_n)$, a $P^i_{z,d}$ by using a scheduling algorithm specifically includes:

computing, by the $S_d$ according to $\phi_z$, $C_z(T_n)$, $C_{z,d}(T_n)$, and $N_{z,d}(T_n)$, a virtual start time $S(P^i_{z,d})$ and a virtual finish time $F(P^i_{z,d})$ of the $P^i_{z,d}$; and adding the $P^i_{z,d}$ to a scheduling queue, where the scheduling queue ranks the user request according to a value of the virtual start time of the user request.

With reference to the first possible implementation manner of the first aspect of the embodiment of the present invention, in a second possible implementation manner, $S(P^i_{z,d}) = \max\{v(P^i_{z,d}), F(P^{i-1}_{z,d})\}$, $$F(P^i_{z,d}) = S(P^i_{z,d}) + \frac{c(P^i_{z,d})}{\phi_z} + \frac{d(P_{z,d}(T_{n+1}))}{\phi_z},$$

$$\text{and } d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$.

With reference to the first possible implementation manner of the first aspect of the embodiment of the present invention, in a third possible implementation manner, $S(P^i_{z,d}) = \max\{v(P^i_{z,d}),$ $$F(P^{i-1}_{z,d}) + \frac{d(P_{z,d}(T_{n+1}))}{\phi_z}\}, F(P^i_{z,d}) = S(P^i_{z,d}) + \frac{c(P^i_{z,d})}{\phi_z},$$

$$\text{and } d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$.

According to a second aspect, an embodiment of the present invention provides a scheduler $S_d$, where the scheduler $S_d$ is applied to a distributed resource system, and the distributed resource system includes schedulers $S_x$, resource-providing entities $R_x$, and a coordinator $G_y$, where x is any one of consecutive natural numbers from 1 to M, and M≥2; d is a number in x; y is any one of consecutive natural numbers from 1 to Y; the $S_x$ communicates with the $R_x$; the $G_y$ communicates with any $S_x$; the scheduler $S_d$ includes a central processing unit and a memory, where the central processing unit executes an executable instruction in the memory, to perform the method in any one of the first aspect to the third possible implementation manner of the first aspect of the embodiment of the present invention.

According to a third aspect, an embodiment of the present invention provides a scheduler $S_d$, where the scheduler $S_d$ is applied to a distributed resource system, and the distributed resource system includes schedulers $S_x$, resource-providing entities $R_x$ and a coordinator $G_y$, where x is any one of consecutive natural numbers from 1 to M, and M≥2; d is a number in x; y is any one of consecutive natural numbers from 1 to Y; the $S_x$ communicates with the $R_x$; the $G_y$ communicates with any $S_x$; and the scheduler $S_d$ includes an acquiring unit and a scheduling unit, where:

the acquiring unit is configured to acquire, in a $T_{n+1}$ period and from a coordinator $G_k$ of a user z, a resource $C_z(T_n)$ that is consumed by a user z request in a $T_n$ period, where $$C_z(T_n) = \sum_{x=1}^{M} C_{z,x}(T_n);$$

k is a natural number, and $1 \leq k \leq Y$; a resource weight of the user z is $\phi_z$; $C_{z,x}(T_n)$ is a quantity of resources that are provided by the $R_x$ and consumed by $N_{z,x}(T_n)$ user z requests received by the $S_x$ in the $T_n$ period; and z indicates an identifier of the user; and the scheduling unit is configured to schedule, according to $\phi_z$, $C_z(T_n)$, $C_{z,d}(T_n)$, and $N_{z,d}(T_n)$, $P^i_{z,d}$ by using a scheduling algorithm, where $P^i_{z,d}$ is the $i^{th}$ user z request received by the $S_d$, and $C_{z,d}(T_n)$ is resource that is provided by an $R_d$ and consumed by $N_{z,d}(T_n)$ user z requests received by the $S_d$ in the $T_n$ period.

According to a fourth aspect, an embodiment of the present invention provides a non-volatile computer readable storage medium, where the non-volatile computer readable storage medium stores a computer instruction that is used to perform user request scheduling in a distributed resource system, and the distributed resource system includes schedulers $S_x$, resource-providing entities $R_x$, and a coordinator $G_y$, where x is any one of consecutive natural numbers from 1 to M, and M≥2; y is any one of consecutive natural numbers from 1 to Y, and Y is a natural number; the $S_x$ communicates with the $R_x$, and the $G_y$ communicates with any $S_x$; and a scheduler $S_d$ executes the computer instruction, to perform the method in any one of the first aspect to the third possible implementation manner of the first aspect of the embodiment of the present invention, where d is a number in x.

According to a fifth aspect, an embodiment of the present invention provides a distributed resource system, where the distributed resource system includes schedulers $S_x$, resource-providing entities $R_x$, and a coordinator $G_y$, where x is any one of consecutive natural numbers from 1 to M, and M≥2; y is any one of consecutive natural numbers from 1 to Y, and Y is a natural number; the $S_x$ communicates with the $R_x$; and the $G_y$ communicates with any $S_x$;

a coordinator $G_k$ of a user z is configured to provide, for a scheduler $S_d$ in a $T_{n+1}$ period, a resource $C_z(T_n)$ that is consumed by a user z request in a $T_n$ period, where $$C_z(T_n) = \sum_{x=1}^{M} C_{z,x}(T_n);$$

d and k are natural numbers, $1 \leq d \leq M$, and $1 \leq k \leq Y$; a resource weight of the user z is $\phi_z$; $C_{z,x}(T_n)$ is a quantity of resources that are provided by the $R_x$ and consumed by $N_{z,x}(T_n)$ user z requests received by the $S_x$ in the $T_n$ period; and z indicates an identifier of the user; and the scheduler $S_d$ is configured to schedule, according to $\phi_z$, $C_z(T_n)$, $C_{z,d}(T_n)$, and $N_{z,d}(T_n)$, a $P^i_{z,d}$ by using a scheduling algorithm, where the $P^i_{z,d}$ is the $i^{th}$ user z request received by the $S_d$, and $C_{z,d}(T_n)$ is a quantity of resources that are provided by an $R_d$ and consumed by $N_{z,d}(T_n)$ user z requests received by the $S_d$ in the $T_n$ period.

According to a sixth aspect, an embodiment of the present invention provides a resource scheduling method in a distributed resource system, where the distributed resource system includes multiple schedulers;

a first scheduler in the multiple schedulers acquires, from a coordinator of the first user, the sum of resources that are consumed in the multiple schedulers by a user request of the first user in a previous period; and the first scheduler schedules the user request of the first user according to a resource weight of the first user, the sum of resources that are consumed in the multiple schedulers by the user request of the first user in the previous period, a resource that is consumed in the first scheduler by the user request of the first user in the previous period, and a quantity of user requests of the first user received by the first scheduler in the previous period.

With reference to the sixth aspect, in a first possible implementation manner, that the first scheduler schedules the user request of the first user according to a resource weight of the first user, the sum of resources that are consumed in the multiple schedulers by the user request of the first user in the previous period, a resource that is consumed in the first scheduler by the user request of the first user in the previous period, and a quantity of user requests of the first user received by the first scheduler in the previous period specifically includes:

computing, by the first scheduler according to the resource weight of the first user, the sum of resources that are consumed in the multiple schedulers by the user request of the first user in the previous period, the resource that is consumed in the first scheduler by the user request of the first user in the previous period, and the quantity of the user requests of the first user received by the first scheduler in the previous period, a virtual start time and a virtual finish time of the user request of the first user; and adding the user request of the first user to a scheduling queue, where the scheduling queue ranks the user request of the first user according to a value of the virtual start time of the user request.

According to a seventh aspect, an embodiment of the present invention provides a distributed resource system, where the distributed resource system includes multiple schedulers, and a first scheduler in the multiple schedulers includes an acquiring unit and a scheduling unit, where:

the acquiring unit is configured to acquire, from a coordinator of the first user, the sum of resources that are consumed in the multiple schedulers by a user request of the first user in a previous period; and the scheduling unit is configured to schedule the user request of the first user according to a resource weight of the first user, the sum of resources that are consumed in the multiple schedulers by the user request of the first user in the previous period, a resource that is consumed in the first scheduler by the user request of the first user in the previous period, and a quantity of user requests of the first user received by the first scheduler in the previous period.

With reference to the seventh aspect, in a first possible implementation manner, the scheduling unit is specifically configured to compute, according to the resource weight of the first user, the sum of resources that are consumed in the multiple schedulers by the user request of the first user in the previous period, the resource that is consumed in the first scheduler by the user request of the first user in the previous period, and the quantity of the user requests of the first user received by the first scheduler in the previous period, a virtual start time and a virtual finish time of the user request of the first user; and add the user request of the first user to a scheduling queue, where the scheduling queue ranks the user request of the first user according to a value of the virtual start time of the user request.

According to the method for scheduling a user request in a distributed resource system, the apparatus, and the system that are provided by embodiments of the present invention, in a $T_{n+1}$ period, an $S_d$ acquires, from a coordinator $G_k$ of a user z, a resource $C_z(T_n)$ that is consumed by a user z request in a $T_n$ period, and the $S_d$ schedules, according to $\phi_z$, $C_z(T_n)$, $C_{z,d}(T_n)$, and $N_{z,d}(T_n)$, a $P^i_{z,d}$ by using a scheduling algorithm. The user z request can be scheduled without depending on a user agent. In addition, the $S_d$ schedules, according to $\phi_z$, $C_z(T_n)$, $C_{z,d}(T_n)$, and $N_{z,d}(T_n)$, the $P^i_{z,d}$ by using the scheduling algorithm, thereby implementing global scheduling on the user z request and ensuring a performance requirement of the user z.

BRIEF DESCRIPTION OF DRAWINGS

To describe the technical solutions in the embodiments of the present invention more clearly, the following briefly introduces the accompanying drawings required for describing the embodiments.

FIG. 3B is a diagram of a relationship among a scheduler A, a resource-providing entity A, and a coordinator A;

FIG. 4 is a schematic diagram of a method according to an embodiment of the present invention;

FIG. 6 is a schematic diagram of a status of user requests in a scheduling queue;

FIG. 9 is a schematic diagram of a status of user requests in a scheduling queue;

FIG. 10 is a schematic diagram of a status of user requests in a scheduling queue;

DESCRIPTION OF EMBODIMENTS

The following clearly describes the technical solutions in the embodiments of the present invention with reference to the accompanying drawings in the embodiments of the present invention.

Figure 1:
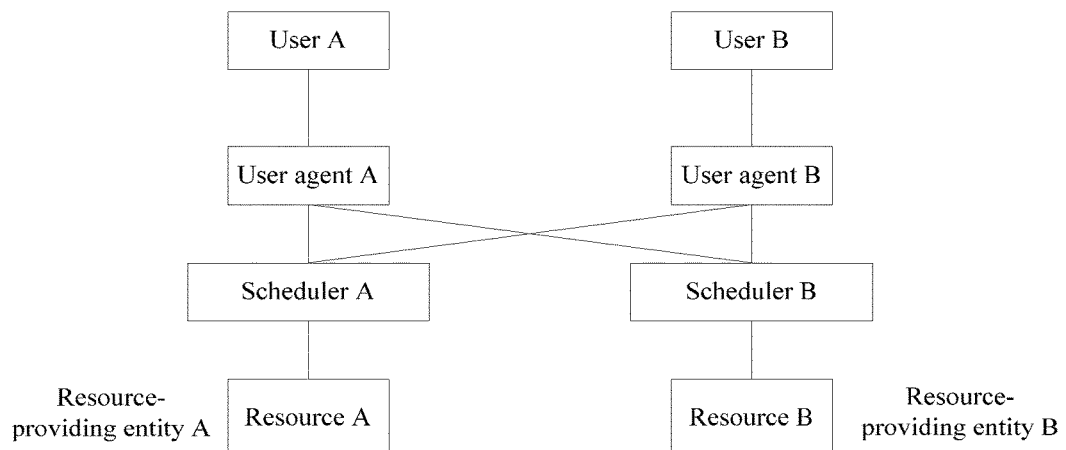
FIG. 1 is a schematic diagram of a distributed resource system in the prior art.
Figure 2:
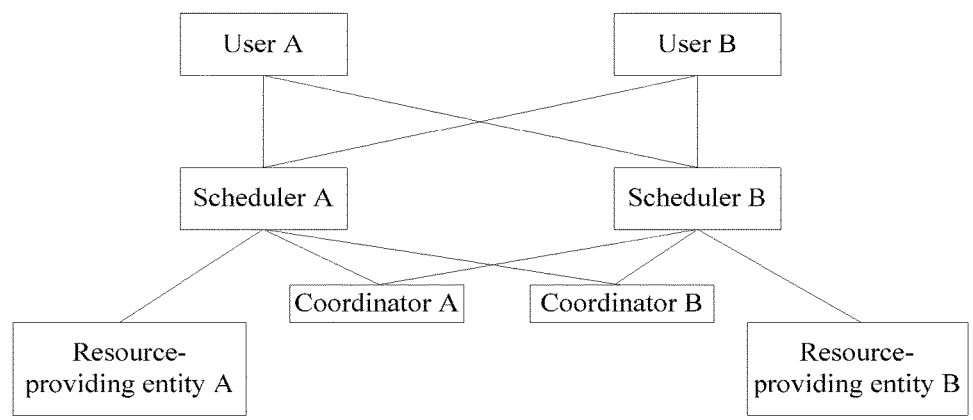
FIG. 2 is a schematic diagram of a distributed resource system according to an embodiment of the present invention.

As shown in FIG. 2, an embodiment of the present invention provides a distributed resource system. The distributed resource system includes a scheduler A, a scheduler B, a resource-providing entity A, a resource-providing entity B, a coordinator A, and a coordinator B. The scheduler A communicates with the resource-providing entity A, and is configured to schedule a user request sent to the resource-providing entity A. The scheduler B communicates with the resource-providing entity B, and is configured to schedule a user request sent to the resource-providing entity B. The coordinator A communicates with the scheduler A and the scheduler B, and the coordinator B communicates with the scheduler A and the scheduler B. A resource in this embodiment of the present invention may be a physical resource or a virtual resource, such as a CPU computing capability, hard disk space, a memory space, network bandwidth, or the like. A user in this embodiment of the present invention may refer to a client, a virtual machine, an application process, or the like, which is not specifically limited in this embodiment of the present invention. A resource allocated by a resource-providing entity for a user A request and a resource allocated by the resource-providing entity for a user B request are resources of a same type. Resources that are provided by the resource-providing entity A and the resource-providing entity B for a user A request and resources that are provided by the resource-providing entity A and the resource-providing entity B for a user B request are resources of a same type. In this embodiment of the present invention, a resource allocated by a resource-providing entity to a user request has the same meaning as a resource provided by a resource-providing entity for a user request, which may also be expressed as a resource of a resource-providing entity that is consumed by a user request, or a resource that is provided by a resource-providing entity and consumed by a user request. A resource that is provided by a resource-providing entity and consumed by a user request refers to a resource that needs to be consumed by the user request, which specifically includes a resource that has been consumed, or includes, if the user request has already been processed by the resource-providing entity, a resource that needs to be consumed by the user request after the user request is received by a scheduler and before the user request is processed by the resource-providing entity. In an implementation manner, after receiving a user request, a scheduler can calculate a quantity of resources that are provided by a resource-providing entity and need to be consumed by the user request. For example, if a scheduler A receives 100 user requests in a period, resources that are provided by a resource-providing entity and consumed by the 100 user requests can be calculated by summing up resources that are provided by the resource-providing entities and need to be consumed by all user requests.

This embodiment of the present invention is described by using an example in which a resource is an IOPS capability, the resource-providing entity A is a storage array A, and the resource-providing entity B is a storage array B.

Figure 3A:
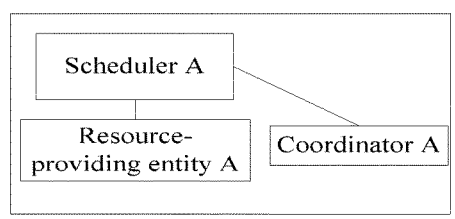
FIG. 3A is a diagram of a relationship among a scheduler A, a resource-providing entity A, and a coordinator A.

Before this embodiment of the present invention is further described, it should be noted that, a relationship among the scheduler A, the coordinator A, and the resource-providing entity A shown in FIG. 2 is just a logical representation. In specific implementation, the resource-providing entity A, the scheduler A, and the coordinator A may be located in a same apparatus, as shown in FIG. 3a; or, the resource-providing entity A and the scheduler A are located in a same apparatus while the coordinator A is located independently of the resource-providing entity A and the scheduler A, as shown in FIG. 3b; or, another implementation manner may be used. A specific implementation manner is not limited herein. Likewise, for a relationship among the scheduler B, the coordinator B, and the resource-providing entity B shown in FIG. 2, refer to FIG. 3a and FIG. 3b. The scheduler may be an independent device or a hardware module. A function of the scheduler may be further implemented by a processor by executing a specific computer instruction. For example, if functions of the scheduler A, the coordinator A, and the resource-providing entity A are all implemented by a processor by executing specific computer instructions, communication between the scheduler A and the coordinator A, and communication between the scheduler A and the resource-providing entity A may be presented as instruction invoking or links between different program modules. Likewise, the coordinator may be an independent device or a hardware module. A function of the coordinator may be further implemented by a processor by executing a specific computer instruction, which is not limited in this embodiment of the present invention. In specific implementation, steps of the method implemented by a scheduler in this embodiment of the present invention may be implemented by a computer processor by executing a computer instruction in a memory. Details are not described herein again.

In the distributed resource system shown in FIG. 2, when a user A sends a user A request to the storage array A and the storage array B, both the storage array A and the storage array B need to consume an IOPS capability when processing the user A request. Likewise, when a user B sends a user B request to the storage array A and the storage array B, IOPS capabilities of the storage array A and the storage array B also need to be consumed. Particularly, when the IOPS capability of the storage array A cannot meet a requirement of processing the user A request and the user B request at the same time, the scheduler A needs to schedule the received user A request and the received user B request according to a scheduling algorithm; when the IOPS capability of the storage array B cannot meet a requirement of processing the user A request and the user B request at the same time, the scheduler B needs to schedule the received user A request and the received user B request according to a scheduling algorithm.

There is a resource competition relationship between the user A and the user B. To ensure performance for the users, a resource weight is generally allocated to each user in the distributed resource system. The user A and the user B are used as an example in this embodiment of the present invention, where a resource weight $\phi_A$ of the user A is 2, and a resource weight $\phi_B$ of the user B is 1. Then a ratio of the resource weight of the user A to the resource weight of the user B is 2:1. The resource weights of the user A and the user B are configured in both the scheduler A and the scheduler B. Specifically, the resource weight of the user A may be delivered by the user A to each of the scheduler A and the scheduler B, and the resource weight of the user B is delivered by the user B to each of the scheduler A and the scheduler B; the scheduler A and the scheduler B perform the foregoing configuration. A form of a resource weight is not limited to the form described in this embodiment of the present invention, and may also be that the resource weight $\phi_A$ of the user A is $\frac{2}{3}$, and the resource weight $\phi_B$ of the user B is $\frac{1}{3}$.

The scheduler A receives the user A request sent by the user A, and the scheduler A receives the user B request sent by the user B. The storage array A needs to provide the IOPS capability for both the user A request and the user B request, or in other words, both the user A request and the user B request consume the IOPS capability provided by the storage array A. Likewise, the scheduler B receives the user A request sent by the user A, and the scheduler B receives the user B request sent by the user B. When the IOPS capability of the storage array A can meet the user A request and the user B request, the scheduler A does not need to schedule the received user A request and the received user B request according to a scheduling algorithm; when the IOPS capability of the storage array B can meet the user A request and the user B request, the scheduler B does not need to schedule the received user A request and the received user B request according to a scheduling algorithm. The scheduler A only needs to compute virtual start times and virtual finish times of the received user requests according to a scheduling algorithm. Likewise, the scheduler B also only needs to compute virtual start times and virtual finish times of the received user requests according to a scheduling algorithm. For meanings of a virtual start time and a virtual finish time, refer to a Start-time Fairness Queuing (SFQ) algorithm. When the user requests need to be scheduled, the scheduler A needs to add, according to a scheduling algorithm, the received user A request and the received user B request to a scheduling queue of the scheduler A for scheduling; the scheduler B also needs to add, according to the scheduling algorithm, the received user A request and the received user B request to a scheduling queue of the scheduler B for scheduling.

As shown in FIG. 4, in step 401, a scheduler A acquires, in a $T_{n+1}$ period and from a home coordinator A of a user A, a resource $C_A(T_n)$ that is consumed by a user A request in a $T_n$ period, and acquires, from a home coordinator B of a user B, a resource $C_B(T_n)$ that is consumed by a user B request in the $T_n$ period, where $T_n$ indicates the $n^{th}$ period, and $T_{n+1}$ indicates the $(n+1)^{th}$ period; $C_A(T_n)$ indicates the sum of a resource $C_{A,A}(T_n)$ that is provided by a resource-providing entity A and consumed by $N_{A,A}(T_n)$ user A requests received by the scheduler A in the $T_n$ period, and a resource $C_{A,B}(T_n)$ that is provided by a resource-providing entity B and consumed by $N_{A,B}(T_n)$ user A requests received by a scheduler B in the $T_n$ period; and $C_B(T_n)$ indicates the sum of a resource $C_{B,A}(T_n)$ that is provided by the resource-providing entity A and consumed by $N_{B,A}(T_n)$ user B requests received by the scheduler A in the $T_n$ period, and a resource $C_{B,B}(T_n)$ that is provided by the resource-providing entity B and consumed by $N_{B,B}(T_n)$ user B requests received by the scheduler B in the $T_n$ period. The home coordinator A of the user A refers to a coordinator that acquires, in a distributed resource system, the sum of a resource of the storage array A that is consumed by the user A request processed by the scheduler A in the $T_n$ period, and a resource of the storage array B that is consumed by the user A request processed by the scheduler B in the $T_n$ period. The home coordinator A of the user A is also called a coordinator A of the user A. Likewise, a home coordinator of a user is also called a coordinator of the user.

The scheduler A acquires, in the $T_n$ period and according to a resource that is provided by the resource-providing entity A and consumed by each received user A request, the resource $C_{A,A}(T_n)$ that is provided by the resource-providing entity A and consumed by the $N_{A,A}(T_n)$ user A requests processed by the scheduler A in the $T_n$ period; and the scheduler A acquires, in the $T_n$ period and according to a resource that is provided by the resource-providing entity A and consumed by each received user B request, the resource $C_{B,A}(T_n)$ that is provided by the resource-providing entity A and consumed by the $N_{B,A}(T_n)$ user B requests processed by the scheduler A in the $T_n$ period. Likewise, the scheduler B acquires, in the $T_n$ period and according to a resource that is provided by the resource-providing entity B and consumed by each received user A request, the resource $C_{A,B}(T_n)$ that is provided by the resource-providing entity B and consumed by the $N_{A,B}(T_n)$ user A requests processed by the scheduler B in the $T_n$ period; and the scheduler B acquires, in the $T_n$ period and according to a resource that is provided by the resource-providing entity B and consumed by each received user B request, the resource $C_{B,B}(T_n)$ that is provided by the resource-providing entity B and consumed by the $N_{B,B}(T_n)$ user B requests processed by the scheduler B in the $T_n$ period. Resources consumed by the user A requests processed in the $T_n$ period are $C_A(T_n)=C_{A,A}(T_n)+C_{A,B}(T_n)$, and resources consumed by the user B requests processed in the $T_n$ period are $C_B(T_n)=C_{B,A}(T_n)+C_{B,B}(T_n)$.

Specifically, the coordinator A acquires $C_{A,A}(T_n)$ and $C_{A,B}(T_n)$. An implementation manner is that the scheduler A proactively sends the $C_{A,A}(T_n)$ to the coordinator A, and the scheduler B proactively sends the $C_{A,B}(T_n)$ to the coordinator A. Another implementation manner is that the coordinator A requests to acquire the $C_{A,A}(T_n)$ from the scheduler A, and the coordinator A requests to acquire the $C_{A,B}(T_n)$ from the scheduler B. Specifically, the coordinator A may acquire the $C_{A,A}(T_n)$ and the $C_{A,B}(T_n)$ at one time, or the coordinator A may communicate with the scheduler A and the scheduler B in real time, to acquire, in real time, the resource that is provided by the resource-providing entity A and consumed by each user A request received by the scheduler A, and acquire, in real time, the resource that is provided by the resource-providing entity B and consumed by each user A request received by the scheduler B. For a manner in which the coordinator B acquires the resources $C_B(T_n)$ consumed for processing the user B requests, refer to the manner of the coordinator A, and details are not described herein again.

The scheduler A acquires, from the home coordinator A of the user A, the resource $C_A(T_n)$ consumed by the user A requests in the $T_n$ period, and acquires, from the home coordinator B of the user B, the resource $C_B(T_n)$ consumed by the user B requests in the $T_n$ period. In an implementation manner, in a $T_{n+1}$ period, the coordinator A sends the $C_A(T_n)$ to each of the scheduler A and the scheduler B, and the coordinator B sends the $C_B(T_n)$ to each of the scheduler A and the scheduler B. In another implementation manner, in a $T_{n+1}$ period, the scheduler A requests the $C_A(T_n)$ from the coordinator A, the scheduler A requests the $C_B(T_n)$ from the coordinator B; and the scheduler B requests the $C_A(T_n)$ from the coordinator A, the scheduler B requests the $C_B(T_n)$ from the coordinator B. The foregoing two manners are both described as: in a $T_{n+1}$ period, the scheduler A acquires, from the home coordinator A of the user A, the resources $C_A(T_n)$ consumed by the user A requests in the $T_n$ period, and acquires, from the home coordinator B of the user B, the resources $C_B(T_n)$ consumed by the user B requests in the $T_n$ period. It can be known from the foregoing description that, in either of the foregoing implementation manners, the scheduler A stores the $N_{A,A}(T_n)$, $N_{B,A}(T_n)$, $C_{A,A}(T_n)$, and $C_{B,A}(T_n)$; and the scheduler B stores the $N_{A,B}(T_n)$, $N_{B,B}(T_n)$, $C_{A,B}(T_n)$, and $C_{B,B}(T_n)$.

As for determining of a home coordinator of a user, a manner may be that a coordinator is configured as a home coordinator of a user; or when an identifier of a user is an integer, a modulo operation is performed on a total quantity of coordinators according to the identifier of the user, to determine a home coordinator of the user; or a hash function may be used to perform computation on an identifier of a user to obtain a hash value, and then a modulo operation is performed on a total quantity of coordinators by using the hash value, to determine a home coordinator of the user. For example, there are 100 users and 20 coordinators, and identifiers of the users are from 1 to 100, the 20 coordinators are numbered from 1 to 20, and a modulo operation is performed on a total quantity of the coordinators according to the identifiers of the users, to determine a home coordinator of each user. The present invention sets no limitation thereto. A total quantity of coordinators may be less than or equal to a quantity of schedulers, and each coordinator can communicate with any scheduler.

Step 402. The scheduler A schedules, according to $\phi_A$, $C_A(T_n)$, $C_{A,A}(T_n)$, and $N_{A,A}(T_n)$, the received user A request by using a scheduling algorithm; and the scheduler A schedules, according to $\phi_B$, $C_B(T_n)$, $C_{B,A}(T_n)$, and $N_{B,A}(T_n)$, the received user B request by using the scheduling algorithm.

Likewise, the scheduler B schedules, according to $\phi_A$, $C_A(T_n)$, $C_{A,B}(T_n)$, and $N_{A,B}(T_n)$, a received user A request by using a scheduling algorithm; and the scheduler B schedules, according to $\phi_B$, $C_B(T_n)$, $C_{B,B}(T_n)$, and $N_{B,B}(T_n)$, a received user B request by using the scheduling algorithm.

When a user request in a scheduler is scheduled according to the method shown in FIG. 4, the scheduler A performs scheduling according to a quantity of resources that are consumed by the user A request in the distributed system in a previous period, a resource weight of the user A, a quantity of user A requests received by the scheduler A in the previous period, and the resource that is provided by the resource-providing entity A and consumed by the user A request received by the scheduler A in the previous period, where the quantity of resources that are consumed by the user A request in the distributed system in a previous period is acquired from the coordinator A. In an architecture without a user agent in the prior art, a coordinator is used to acquire a quantity of resources that are consumed by a user A request in a distributed system in a previous period, so that a scheduler A does not need to perform an extra operation, which can reduce a resource usage of the scheduler A. In addition, the scheduler schedules the user A request according to $\phi_A$, $C_A(T_n)$, $C_{A,A}(T_n)$, and $N_{A,A}(T_n)$, thereby implementing global scheduling on the user A requests and ensuring a performance requirement of a user z.

When the scheduler A schedules the user B request, or the scheduler B schedules the user A request, or the scheduler B schedules the user B request, the same foregoing effect can also be achieved. In a user agent-based architecture in the prior art, a scheduler can acquire only a user request and statistics of the user request that are sent by one user agent; therefore, it is difficult to implement global scheduling on a same user request.

In this embodiment of the present invention, that a scheduler A schedules a user A request is used as an example. During global scheduling on the user A request, the scheduler A needs to consider $C_A(T_n)$ in addition to $\phi_A$, $C_{A,A}(T_n)$, and $N_{A,A}(T_n)$ in a previous period, thereby implementing scheduling of the user A request and further ensuring performance for a user A.

Specifically, in this embodiment of the present invention, $P^i_{A,A}$ indicates the $i^{th}$ user A request that is sent by the user A and received by the scheduler A, where a storage array A provides a resource for the $P^i_{A,A}$; and $P^i_{A,B}$ indicates the $i^{th}$ user A request that is sent by the user A and received by a scheduler B, where a storage array B provides a resource for the $P^i_{A,B}$. $P^k_{B,A}$ indicates the $k^{th}$ user B request that is sent by a user B and received by the scheduler A, where the storage array A provides a resource for the $P^k_{B,A}$; and $P^k_{B,B}$ indicates the $k^{th}$ user B request that is sent by the user B and received by the scheduler B, where the storage array B provides a resource for the $P^k_{B,B}$. In this embodiment of the present invention, $\phi_A=2$, and $\phi_B=1$.

In a $T_n$ period, when a quantity of user A requests and user B requests that are received by the scheduler A is less than an IOPS capability of the storage array A, there is no need to schedule, by using a scheduling algorithm, the user A requests and the user B requests that are received by the scheduler A, and the user A requests and the user B requests are directly processed by the storage array A. When a quantity of user A requests and user B requests that are received by the scheduler B is less than an IOPS capability of the storage array B, there is also no need to schedule, by using a scheduling algorithm, the user A requests and the user B requests that are received by the scheduler B, and the user A requests and the user B requests are directly processed by the storage array B. However, a home coordinator A of the user A needs to acquire resources that are consumed by user A requests received by schedulers in the $T_n$ period. In this embodiment of the present invention, the home coordinator A of the user A acquires a resource $C_A(T_n)$ that is consumed by the user A requests that are received by the scheduler A and the scheduler B in the $T_n$ period. A home coordinator B of the user B also acquires a resource $C_B(T_n)$ that is consumed by the user B requests that are received by the scheduler A and the scheduler B in the $T_n$ period. The coordinator A sends $C_A(T_n)$ to the scheduler A and the scheduler B, and the coordinator B sends $C_B(T_n)$ to the scheduler A and the scheduler B. When a quantity of the user A requests received by the scheduler A in the $T_n$ period is $N_{A,A}(T_n)$, a consumed resource that is provided by the storage array A is $C_{A,A}(T_n)$; when a quantity of the user B requests received by the scheduler A in the $T_n$ period is $N_{B,A}(T_n)$ a consumed resource that is provided by the storage array A is $C_{B,A}(T_n)$. When a quantity of the user A requests received by the scheduler B in the $T_n$ period is $N_{A,B}(T_n)$, a consumed resource that is provided by the storage array B is $C_{A,B}(T_n)$; when a quantity of the user B requests received by the scheduler B in the $T_n$ period is $N_{B,B}(T_n)$, a consumed resource that is provided by the storage array A is $C_{B,B}(T_n)$.

The scheduler A is used as an example. In a $T_{n+1}$ period, the scheduler A acquires, from the home coordinator A of the user A, a resource $C_A(T_n)$ that is consumed by a user A request in the $T_n$ period. In the $T_{n+1}$ period, when an IOPS capability of the storage array A cannot meet a user A request and a user B request, the scheduler A adds, by using a scheduling algorithm, the received user A request and the received user B request to a scheduling queue of the scheduler A for scheduling. When receiving the user A request and the user B request, the scheduler A computes a virtual start time and a virtual finish time of the user A request, and a virtual start time and a virtual finish time of the user B request. The user A request and the user B request are added to the scheduling queue, and the user A request and the user B request are ranked in the scheduling queue in ascending order of the virtual start times for processing. A user request whose virtual start time is the earliest is ranked at the queue head of the scheduling queue, and a user request whose virtual start time is the latest is ranked at the queue tail of the scheduling queue. The queue head of the scheduling queue refers to a position at which the storage array A performs user request processing first in the scheduling queue. When processing the user requests, the storage array A acquires a user request from the queue head of the scheduling queue for processing, that is, a user request whose virtual start time is the earliest is processed first. The storage array A processes the user requests in the scheduling queue in ascending order of the virtual start times of the user requests.

In a first implementation manner, a virtual start time of a $P^i_{A,A}$ that is received by the scheduler A is represented by $S(P^i_{A,A})$, and a virtual finish time of the $P^i_{A,A}$ is represented by $F(P^i_{A,A})$. $S(P^i_{A,A})=\max\{v(P^i_{A,A}),\ F(P^{i-1}_{A,A})\}$, where $v(P^i_{A,A})$ indicates a virtual time of the scheduler A when the scheduler A receives the $P^i_{A,A}$, $F(P^{i-1}_{A,A})$ indicates a virtual finish time of a $P^{i-1}{}_{A,A}$, and $\max\{v(P^i{}_{A,A}), F(P^{i-1}{}_{A,A})\}$ indicates a maximum value in $v(P^i{}_{A,A})$ and $F(P^{i-1}{}_{A,A})$.

$$F(P^i_{A,A}) = S(P^i_{A,A}) + \frac{c(P^i_{A,A})}{\phi_A} + \frac{d(P_{A,A}(T_{n+1}))}{\phi_A}.$$

For meanings of the virtual start time $S(P^i{}_{A,A})$, the virtual finish time $F(P^i{}_{A,A})$, and the virtual time $v(P^i{}_{A,A})$, refer to a Start-time Fairness Queuing (SFQ) algorithm, and details are not described in this embodiment of the present invention again. $c(P^i{}_{A,A})$ indicates a resource that is provided by the storage array A and consumed by the $P^i{}_{A,A}$, which is one IOPS in this embodiment of the present invention; and $d(P_{A,A}(T_{n+1}))$ indicates a value of a delay of each user A request that is received by the scheduler A in a $T_{n+1}$ period, and $$d(P_{A,A}(T_{n+1})) = \frac{C_A(T_n) - C_{A,A}(T_n)}{N_{A,A}(T_n)} = \frac{C_{A,B}(T_n)}{N_{A,A}(T_n)}.$$

Likewise, a virtual start time of a $P^k{}_{B,A}$ that is received by the scheduler A is represented by $S(P^k{}_{B,A})$, and a virtual finish time of the $P^k{}_{B,A}$ is represented by $F(P^k{}_{B,A})$. $S(P^k{}_{B,A})=\max\{v(P^k{}_{B,A}), F(P^{k-1}{}_{B,A})\}$, where $v(P^k{}_{B,A})$ indicates a virtual time of the scheduler A when the scheduler A receives the $P^k{}_{B,A}$, $F(P^{k-1}{}_{B,A})$ indicates a virtual finish time of a $P^{k-1}{}_{B,A}$, and $\max\{v(P^k{}_{B,A}), F(P^{k-1}{}_{B,A})\}$ indicates a maximum value in $v(P^k{}_{B,A})$ and $F(P^{k-1}{}_{B,A})$. $F(P^k_{B,A}) = S(P^k_{B,A}) + \frac{c(P^k_{B,A})}{\phi_B} + \frac{d(P_{B,A}(T_{n+1}))}{\phi_B},$ where $c(P^k{}_{B,A})$ indicates a resource that is provided by the storage array B and consumed by the $P^k{}_{B,A}$, which is one IOPS in this embodiment of the present invention; and $d(P_{B,A}(T_{n+1}))$ indicates a value of a delay of each user B request that is received by the scheduler A in a $T_{n+1}$ period, and $$d(P_{B,A}(T_{n+1})) = \frac{C_B(T_n) - C_{B,A}(T_n)}{N_{B,A}(T_n)} = \frac{C_{B,B}(T_n)}{N_{B,A}(T_n)}.$$

A virtual start time of a $P^i{}_{A,B}$ that is received by the scheduler B is represented by $S(P^i{}_{A,B})$, and a virtual finish time of the $P^i{}_{A,B}$ is represented by $F(P^i{}_{A,B})$. $S(P^i{}_{A,B})=\max\{v(P^i{}_{A,B}), F(P^{i-1}{}_{A,B})\}$, where $v(P^i{}_{A,B})$ indicates a virtual time of the scheduler B when the scheduler B receives the $P^i{}_{A,B}$, $F(P^{i-1}{}_{A,B})$ indicates a virtual finish time of a $P^{i-1}{}_{A,B}$, and $\max\{v(P^i{}_{A,B}), F(P^{i-1}{}_{A,B})\}$ indicates a maximum value in $v(P^i{}_{A,B})$ and $F(P^{i-1}{}_{A,B})$.

$$F(P^i_{A,B}) = S(P^i_{A,B}) + \frac{c(P^i_{A,B})}{\phi_A} + \frac{d(P_{A,B}(T_{n+1}))}{\phi_A},$$

where $c(P^i{}_{A,B})$ indicates a resource that is provided by the storage array B and consumed by the $P^i{}_{A,B}$, which is one IOPS in this embodiment of the present invention; and $d(P_{A,B}(T_{n+1}))$ indicates a value of a delay of each user A request that is received by the scheduler B in a $T_{n+1}$ period, and $$d(P_{A,B}(T_{n+1})) = \frac{C_A(T_n) - C_{A,B}(T_n)}{N_{A,B}(T_n)} = \frac{C_{A,A}(T_n)}{N_{A,B}(T_n)}.$$

Likewise, a virtual start time of a $P^k{}_{B,B}$ that is received by the scheduler B is represented by $S(P^k{}_{B,B})$, and a virtual finish time of the $P^k{}_{B,B}$ is represented by $F(P^k{}_{B,B})$. $S(P^k{}_{B,B})=\max\{v(P^k{}_{B,B}), F(P^{k-1}{}_{B,B})\}$, where $v(P^k{}_{B,B})$ indicates a virtual time of the scheduler B when the scheduler B receives the $P^k{}_{B,B}$, $F(P^{k-1}{}_{B,B})$ indicates a virtual finish time of a $P^{k-1}{}_{B,B}$, and $\max\{v(P^k{}_{B,B}), F(P^{k-1}{}_{B,B})\}$ indicates a maximum value in $v(P^k{}_{B,B})$ and $F(P^{k-1}{}_{B,B})$.

$$F(P^k_{B,B}) = S(P^k_{B,B}) + \frac{c(P^k_{B,B})}{\phi_B} + \frac{d(P_{B,B}(T_{n+1}))}{\phi_B},$$

where $c(P^k{}_{B,B})$ indicates a resource that is provided by the storage array B and consumed by the $P^k{}_{B,B}$, which is one IOPS in this embodiment of the present invention; and $d(P_{B,B}(T_{n+1}))$ indicates a value of a delay of each user B request that is received by the scheduler B in a $T_{n+1}$ period, and $$d(P_{B,B}(T_{n+1})) = \frac{C_B(T_n) - C_{B,B}(T_n)}{N_{B,B}(T_n)} = \frac{C_{B,A}(T_n)}{N_{B,B}(T_n)}.$$

In a second implementation manner, a virtual start time of a $P^i{}_{A,A}$ that is received by the scheduler A is represented by $S(P^i{}_{A,A})$, and a virtual finish time of the $P^i{}_{A,A}$ is represented by $$F(P^i_{A,A}) \cdot S(P^i_{A,A}) = \max\left\{v(P^i_{A,A}), F(P^{i-1}_{A,A}) + \frac{d(P_{A,A}(T_{n+1}))}{\phi_A}\right\},$$

where $v(P^i{}_{A,A})$ indicates a virtual time of the scheduler A when the scheduler A receives the $P^i{}_{A,A}$; $d(P_{A,A}(T_{n+1}))$ indicates a value of a delay of each user A request that is received by the scheduler A in a $T_{n+1}$ period, and $$d(P_{A,A}(T_{n+1})) = \frac{C_A(T_n) - C_{A,A}(T_n)}{N_{A,A}(T_n)} = \frac{C_{A,B}(T_n)}{N_{A,A}(T_n)};$$

$F(P^{i-1}{}_{A,A})$ indicates a virtual finish time of a $P^{i-1}{}_{A,A}$; and $$\max\left\{v(P^i_{A,A}), F(P^{i-1}_{A,A}) + \frac{d(P_{A,A}(T_{n+1}))}{\phi_A}\right\}$$

indicates a maximum value in $v(P^i_{A,A})$ and $$F(P^{i-1}_{A,A}) + \frac{d(P_{A,A}(T_{n+1}))}{\phi_A} \cdot F(P^i_{A,A}) = S(P^i_{A,A}) + \frac{c(P^i_{A,A})}{\phi_A}.$$

For meanings of the virtual start time $S(P^i_{A,A})$, the virtual finish time $F(P^i_{A,A})$ and the virtual time $v(P^i_{A,A})$, refer to a Start-time Fairness Queuing (SFQ) algorithm, and details are not described in this embodiment of the present invention again. $c(P^i_{A,A})$ indicates a resource that is provided by the storage array A and consumed by the $P^i_{A,A}$, which is one IOPS in this embodiment of the present invention. Likewise, a virtual start time of a $P^k_{B,A}$ that is received by the scheduler A is represented by $S(P^k_{B,A})$, and a virtual finish time of the $P^k_{B,A}$ is represented by $F(P^k_{B,A})$.

$$S(P^k_{B,A}) = \max\left\{v(P^k_{B,A}), F(P^{k-1}_{B,A}) + \frac{d(P_{B,A}(T_{n+1}))}{\phi_B}\right\},$$

where $v(P^k_{B,A})$ indicates a virtual time of the scheduler A when the scheduler A receives the $P^k_{B,A}$; $d(P_{B,A}(T))$ indicates a value of a delay of each user B request that is received by the scheduler A in a $T_{n+1}$ period, and $$d(P_{B,A}(T_{n+1})) = \frac{C_B(T_n) - C_{B,A}(T_n)}{N_{B,A}(T_n)}$$
$$= \frac{C_{B,B}(T_n)}{N_{B,A}(T_n)};$$

$F(P^{k-1}_{B,A})$ indicates a virtual finish time of a $P^{k-1}_{B,A}$; and $$\max\left\{v(P^k_{B,A}), F(P^{k-1}_{B,A}) + \frac{d(P_{B,A}(T_{n+1}))}{\phi_B}\right\}$$

indicates a maximum value in $v(P^k_{B,A})$ and $$F(P^{k-1}_{B,A}) + \frac{d(P_{B,A}(T_{n+1}))}{\phi_B} \cdot F(P^k_{B,A}) = S(P^k_{B,A}) + \frac{c(P^k_{B,A})}{\phi_B},$$

where $c(P^k_{B,A})$ indicates a resource that is provided by the storage array B and consumed by the $P^k_{B,A}$, which is one IOPS in this embodiment of the present invention.

A virtual start time of a $P^i_{A,B}$ that is received by the scheduler B is represented by $S(P^i_{A,B})$, and a virtual finish time of the $P^i_{A,B}$ is represented by $F(P^i_{A,B})$.

$$S(P^i_{A,B}) = \max\left\{v(P^i_{A,B}), F(P^{i-1}_{A,B}) + \frac{d(P_{A,B}(T_{n+1}))}{\phi_A}\right\},$$

where $v(P^i_{A,B})$ indicates a virtual time of the scheduler B when the scheduler B receives the $P^i_{A,B}$; $d(P_{A,B}(T_{n+1}))$ indicates a value of a delay of each user A request that is received by the scheduler B in a $T_{n+1}$ period, and $$d(P_{A,B}(T_{n+1})) = \frac{C_A(T_n) - C_{A,B}(T_n)}{N_{A,B}(T_n)}$$
$$= \frac{C_{A,A}(T_n)}{N_{A,B}(T_n)};$$

$F(P^{i-1}_{A,B})$ indicates a virtual finish time of a $P^{i-1}_{A,B}$; and $$\max\left\{v(P^i_{A,B}), F(P^{i-1}_{A,B}) + \frac{d(P_{A,B}(T_{n+1}))}{\phi_A}\right\}$$

indicates a maximum value in $v(P^i_{A,B})$ and $$F(P^{i-1}_{A,B}) + \frac{d(P_{A,B}(T_{n+1}))}{\phi_A} \cdot F(P^i_{A,B}) = S(P^i_{A,B}) + \frac{c(P^i_{A,B})}{\phi_A},$$

where $c(P^i_{A,B})$ indicates a resource that is provided by the storage array B and consumed by the $P^i_{A,B}$ which is one IOPS in this embodiment of the present invention. Likewise, a virtual start time of a $P^k_{B,B}$ that is received by the scheduler B is represented by $S(P^k_{B,B})$, and a virtual finish time of the $P^k_{B,B}$ is represented by $$F(P^k_{B,B}) \cdot S(P^k_{B,B}) = \max\left\{v(P^k_{B,B}), F(P^{k-1}_{B,B}) + \frac{d(P_{B,B}(T_{n+1}))}{\phi_B}\right\},$$

where $v(P^k_{B,B})$ indicates a virtual time of the scheduler B when the scheduler B receives the $P^k_{B,B}$; $d(P_{B,B}(T_{n+1}))$ indicates a value of a delay of each user B request received by the scheduler A in a $T_{n+1}$ period, and $$d(P_{B,B}(T_{n+1})) = \frac{C_B(T_n) - C_{B,B}(T_n)}{N_{B,B}(T_n)}$$
$$= \frac{C_{B,A}(T_n)}{N_{B,B}(T_n)};$$

$F(P^{k-1}_{B,B})$ indicates a virtual finish time of a $P^{k-1}_{B,B}$; and $$\max\left\{v(P^k_{B,B}), F(P^{k-1}_{B,B}) + \frac{d(P_{B,B}(T_{n+1}))}{\phi_B}\right\}$$

indicates a maximum value in $v(P^k_{B,B})$ and $$F(P^{k-1}_{B,B}) + \frac{d(P_{B,B}(T_{n+1}))}{\phi_B} \cdot F(P^k_{B,B}) = S(P^k_{B,B}) + \frac{c(P^k_{B,B})}{\phi_B},$$

where $c(P^k_{B,B})$ indicates a resource that is provided by the storage array B and consumed by the $P^k_{B,B}$ which is one IOPS in this embodiment of the present invention.

Figure 5:
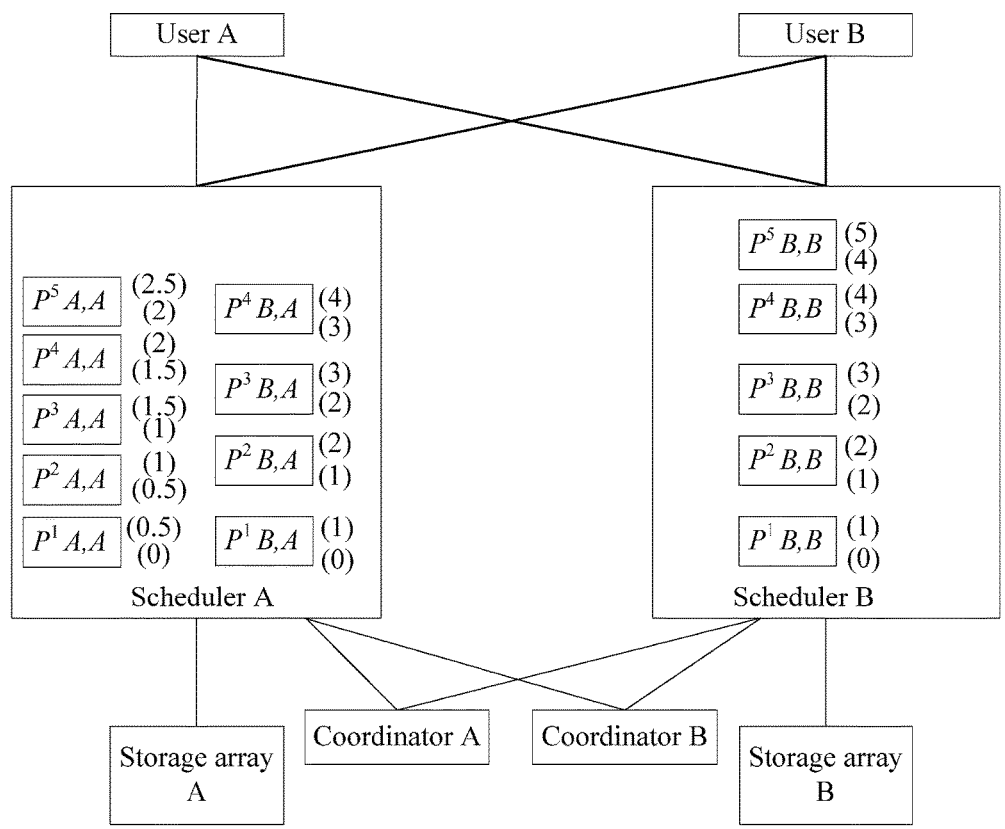
FIG. 5 is a schematic diagram of a status of a distributed resource system according to an embodiment of the present invention.

The first manner of computing a virtual start time and a virtual finish time of a user request is used as an example. As shown in FIG. 5, in this embodiment, after a distributed resource system is initialized, user A requests $P^i_{A,A}$ that are received by a scheduler A in a $T_{n+1}$ period are $P^1_{A,A}$, $P^2_{A,A}$, $P^3_{A,A}$, $P^4_{A,A}$, and $P^5_{A,A}$ respectively, 5 in total. A quantity of user A requests $P^i_{A,B}$ that are received by a scheduler B is 0.

User B requests $P^k_{B,A}$ that are received by the scheduler A are $P^1_{A,B}$, $P^2_{B,A}$, $P^3_{B,A}$, and $P^4_{B,A}$ respectively, 4 in total. User B requests $P^k_{B,B}$ that are received by the scheduler B are $P^1_{B,B}$, $P^2_{B,B}$, $P^3_{B,B}$, $P^4_{B,B}$, and $P^5_{B,B}$ respectively, 5 in total. In this embodiment of the present invention, the $T_{n+1}$ period is actually the first period. The $P^1_{A,A}$ is the first user A request received by the scheduler A. In this case, the received $P^1_{A,A}$ needs to be added to a scheduling queue of the scheduler A for scheduling according to a scheduling algorithm. First, a virtual start time $S(P^1_{A,A})=\max\{v(P^1_{A,A}), F(P^{i-1}_{A,A})\}$ of the $P^1_{A,A}$ is computed. Because the $T_{n+1}$ period is actually the first period, that is, the scheduler A does not receive any $P^i_{A,A}$ previously, $F(P^0_{A,A})$ is Null, the $P^1_{A,A}$ is received after initialization of the scheduler A is completed, and $S(P^1_{A,A})=v(P^1_{A,A})=0$. A virtual finish time of the $P^1_{A,A}$ is computed:

$$F(P^1_{A,A}) = S(P^1_{A,A}) + \frac{c(P^1_{A,A})}{\phi_A} + \frac{d(P_{A,A}(T_{n+1}))}{\phi_A},$$

where $$S(P^1_{A,A}) = 0,$$

$$c(P^1_{A,A}) = 1,$$

$$\phi_A = 2,$$

$$d(P_{A,A}(T_{n+1})) = \frac{C_A(T_n) - C_{A,A}(T_n)}{N_{A,A}(T_n)} = \frac{C_{A,B}(T_n)}{N_{A,A}(T_n)},$$

$$C_{A,B}(T_n) = 0,$$

and $$N_{A,A}(T_n) = 0;$$

then $d(P_{A,A}(T_{n+1}))=0$, and $F(P^1_{A,A})=S(P^1_{A,A})+½=0.5$. Likewise, a virtual start time of the $P^2_{A,A}$ is 0.5, and a virtual finish time of the $P^2_{A,A}$ is 1; a virtual start time of the $P^3_{A,A}$ is 1, and a virtual finish time of the $P^3_{A,A}$ is 1.5; a virtual start time of the $P^4_{A,A}$ is 1.5, and a virtual finish time of the $P^4_{A,A}$ is 2; and a virtual start time of the $P^5_{A,A}$ is 2, and a virtual finish time of the $P^5_{A,A}$ is 2.5.

$$\boxed{P^1_{A,A}}\,\,\begin{matrix}(0.5)\\(0)\end{matrix}$$

in FIG. 5 indicates that the virtual start time of the $P^1_{A,A}$ is 0 and the virtual finish time of the $P^1_{A,A}$ is 0.5. For other similar identifiers in FIG. 5 and subsequent figures, refer to the meaning of $$\boxed{P^1_{A,A}}\,\,\begin{matrix}(0.5)\\(0)\end{matrix},$$

and details are not described herein again.

For the user B request $P^1_{B,A}$ that is received by the scheduler A, a virtual start time of the $P^1_{B,A}$ is computed: $S(P^1_{B,A})=\max\{v(P^1_{B,A}), F(P^0_{B,A})\}$. Because the $T_{n+1}$ period is actually the first period, that is, the scheduler A does not receive any $P^k_{B,A}$ previously, $F(P^0_{B,A})$ is empty, the $P^1_{B,A}$ is received after initialization of the scheduler A is completed, and $v(P^1_{B,A})=0$. A virtual finish time of the $P^1_{B,A}$ is $$F(P^1_{B,A}) = S(P^1_{B,A}) + \frac{c(P^1_{B,A})}{\phi_B} + \frac{d(P_{B,A}(T_{n+1}))}{\phi_B},$$

where $$c(P^1_{B,A}) = 1,$$

$$d(P_{B,A}(T_{n+1})) = \frac{C_B(T_n) - C_{B,A}(T_n)}{N_{B,A}(T_n)} = \frac{C_{B,B}(T_n)}{N_{B,A}(T_n)},$$

$C_{B,B}(T_n)=0$, and $N_{B,A}(T_n)=0$; then $d(P_{B,A}(T_{n+1}))=0$, $\phi_B=1$, and $F(P^1_{B,A})=1$. Likewise, a virtual start time of the $P^2_{B,A}$ is 1, and a virtual finish time of the $P^2_{B,A}$ is 2; a virtual start time of the $P^3_{B,A}$ is 2, and a virtual finish time of the $P^3_{B,A}$ is 3; and a virtual start time of the $P^4_{B,A}$ is 3, and a virtual finish time of the $P^4_{B,A}$ is 4.

In this case, for the user B request $P^1_{B,B}$ that is received by the scheduler B, the received $P^1_{B,B}$ needs to be scheduled, and a virtual start time of the $P^1_{B,B}$ is computed: $S(P^1_{B,B})=\max\{v(P^1_{B,B}), F(P^0_{B,B})\}$. Because the $T_{n+1}$ period is actually the first period, that is, the scheduler B does not receive any $P^k_{B,B}$ previously, $F(P^0_{B,B})$ is empty, the $P^1_{B,B}$ is received after initialization of the scheduler B is completed, and $v(P^1_{B,B})=0$. A virtual finish time of the $P^1_{B,B}$ is $$F(P^1_{B,B}) = S(P^1_{B,B}) + \frac{c(P^1_{B,B})}{\phi_B} + \frac{d(P_{B,B}(T_{n+1}))}{\phi_B},$$

where $$c(P^1_{B,B}) = 1,$$

$$d(P_{B,B}(T_{n+1})) = \frac{C_B(T_n) - C_{B,B}(T_n)}{N_{B,B}(T_n)} = \frac{C_{B,A}(T_n)}{N_{B,B}(T_n)},$$

$C_{B,A}(T_n)=0$, and $N_{B,B}(T_n)=0$; then $d(P_{B,B}(T_{n+1}))=0$, $\phi_B=1$, and $F(P^1_{B,B})=1$. Likewise, a virtual start time of the $P^2_{B,B}$ is 1, and a virtual finish time of the $P^2_{B,B}$ is 2; a virtual start time of the $P^3_{B,B}$ is 2, and a virtual finish time of the $P^3_{B,B}$ is 3; a virtual start time of the $P^4_{B,B}$ is 3, and a virtual finish time of the $P^4_{B,B}$ is 4; and a virtual start time of the $P^5_{B,B}$ is 4, and a virtual finish time of the $P^5_{B,B}$ is 5.

The scheduler A computes virtual start times and virtual finish times of the $P^1_{A,A}$, $P^2_{A,A}$, $P^3_{A,A}$, $P^4_{A,A}$, and $P^5_{A,A}$, and computes virtual start times and virtual finish times of the $P^1_{B,A}$, $P^2_{B,A}$, $P^3_{B,A}$, and $P^4_{B,A}$. According to the virtual start times of the user requests that are received by the scheduler A, the user requests are ranked in a scheduling queue in ascending order of the virtual start times for processing, that is, an order from the queue head to the queue tail in the scheduling queue is $P^1_{A,A}$, $P^2_{A,A}$, $P^1_{B,A}$, $P^3_{A,A}$, $P^4_{A,A}$, $P^2_{B,A}$, $P^5_{A,A}$, $P^3_{B,A}$, and $P^4_{B,A}$, as shown in FIG. 6. The storage array A processes the user requests in the order of $P^1_{A,A}$, $P^2_{A,A}$, $P^1_{B,A}$, $P^3_{A,A}$, $P^4_{A,A}$, $P^2_{B,A}$, $P^5_{A,A}$, $P^3_{B,A}$, and $P^4_{B,A}$. As shown in FIG. 6, when there is resource competition between the user A requests and the user B requests, a group of user requests $P^1_{A,A}$, $P^2_{A,A}$, and $P^1_{B,A}$ in the scheduling queue consume, according to a ratio of 2:1, the IOPS that is provided by the storage array A. Another group of user requests $P^3_{A,A}$, $P^4_{A,A}$, and $P^2_{B,A}$ in the scheduling queue also meets the requirement.

Figure 7:
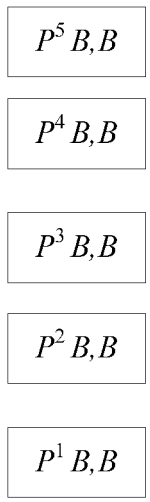
FIG. 7 is a schematic diagram of a status of user requests in a scheduling queue.

The scheduler B computes virtual start times and virtual finish times of the $P^1_{B,B}$, $P^2_{B,B}$, $P^3_{B,B}$, $P^4_{B,B}$, and $P^5_{B,B}$ respectively. According to the virtual start times of all the user requests that are received by the scheduler B, the user requests are ranked in a scheduling queue in ascending order of the virtual start times for processing, that is, an order from the queue head to the queue tail in the scheduling queue is $P^1_{B,B}$, $P^2_{B,B}$, $P^3_{B,B}$, $P^4_{B,B}$, and $P^5_{B,B}$, as shown in FIG. 7. The storage array B processes the user requests in the order of $P^1_{B,B}$, $P^2_{B,B}$, $P^3_{B,B}$, $P^4_{B,B}$, and $P^5_{B,B}$. Because there are only the user B requests in the scheduler B, there is no resource competition, and the user B requests are processed in ascending order of the virtual start times of the user B requests.

A person skilled in the art should understand that, in specific implementation, a quantity of user requests that are received by the scheduler A and the scheduler B in a $T_{n+1}$ period may be much greater than the quantity of the user requests provided in the embodiment. A quantity of users is not limited to two. For ease of description in this embodiment of the present invention, in the $T_{n+1}$ period, the user A requests that are received by the scheduler A are $P^1_{A,A}$, $P^2_{A,A}$, $P^3_{A,A}$, $P^4_{A,A}$, and $P^5_{A,A}$, and the user B requests that are received by the scheduler A are $P^1_{B,A}$, $P^2_{B,A}$, $P^3_{B,A}$, and $P^4_{B,A}$; and the user B requests that are received by the scheduler B are $P^1_{B,B}$, $P^2_{B,B}$, $P^3_{B,B}$, $P^4_{B,B}$, and $P^5_{B,B}$.

According to the manner described above, the scheduler A computes a resource $C_{A,A}(T_{n+1})$ that is provided by the storage array A and consumed by $N_{A,A}(T_{n+1})$ user A requests received in the $T_{n+1}$ period, and a resource $C_{B,A}(T_n)$ that is provided by the storage array A and consumed by $N_{B,A}(T_n)$ received user B requests. The scheduler A computes a resource $C_{A,A}(T_{n+1})$ that is provided by the storage array A and consumed by $N_{A,A}(T_{n+1})$ user A requests received in the $T_{n+1}$ period, which is specifically that: in this embodiment of the present invention, one user A request consumes one IOPS, and a quantity of the user A requests received by the scheduler A in the $T_{n+1}$ period is $N_{A,A}(T_{n+1})=5$, and the consumed resource $C_{A,A}(T_{n+1})$ that is provided by the storage array A is five IOPSs. Likewise, a quantity of the user B requests that are received by the scheduler A in the $T_{n+1}$ period is $N_{B,A}(T_{n+1})=4$, and the consumed resource $C_{B,A}(T_{n+1})$ that is provided by the storage array A is four IOPSs. A quantity of the user A requests that are received by the scheduler B in the $T_{n+1}$ period is $N_{A,B}(T_{n+1})=0$, and the consumed resource $C_{A,B}(T_{n+1})$ that is provided by the storage array B is 0 IOPS. Likewise, a quantity of the user B requests that are received by the scheduler B in the $T_{n+1}$ period is $N_{B,B}(T_{n+1})=5$, and the consumed resource $C_{B,B}(T_{n+1})$ that is provided by the storage array B is five IOPSs. The coordinator A acquires that the resource $C_{A,A}(T_{n+1})$ that is provided by the storage array A and consumed by the user A requests processed by the scheduler A in the $T_{n+1}$ period is five IOPSs, and the resource that is provided by the storage array B and consumed by the user A requests processed by the scheduler B in the $T_{n+1}$ period is zero IOPS. Therefore, a total quantity of resources that are consumed by the user A requests in the $T_{n+1}$ period is $C_A(T_{n+1})=C_{A,A}(T_{n+1})+C_{A,B}(T_{n+1})$, where $C_A(T_{n+1})=5$ IOPSs. Likewise, the coordinator B acquires that a total quantity of the resources that are consumed by the user B requests in the $T_{n+1}$ period is $C_B(T_{n+1})=C_{B,A}(T_{n+1})+C_{B,B}(T_{n+1})$, where $C_B(T_{n+1})=9$ IOPSs. The coordinator A sends a message to each of the scheduler A and the scheduler B, where the message carries $C_A(T_{n+1})$, so that the scheduler A and the scheduler B acquire, from the coordinator A, that the quantity of IOPSs that are consumed by the user A requests in the $T_{n+1}$ period is 5. Likewise, the coordinator B sends a message to each of the scheduler A and the scheduler B, where the message carries $C_B(T_{n+1})$, so that the scheduler A and the scheduler B acquire, from the coordinator B, that the quantity of IOPSs that are consumed by the user B requests in the $T_{n+1}$ period is 9.

Figure 8:
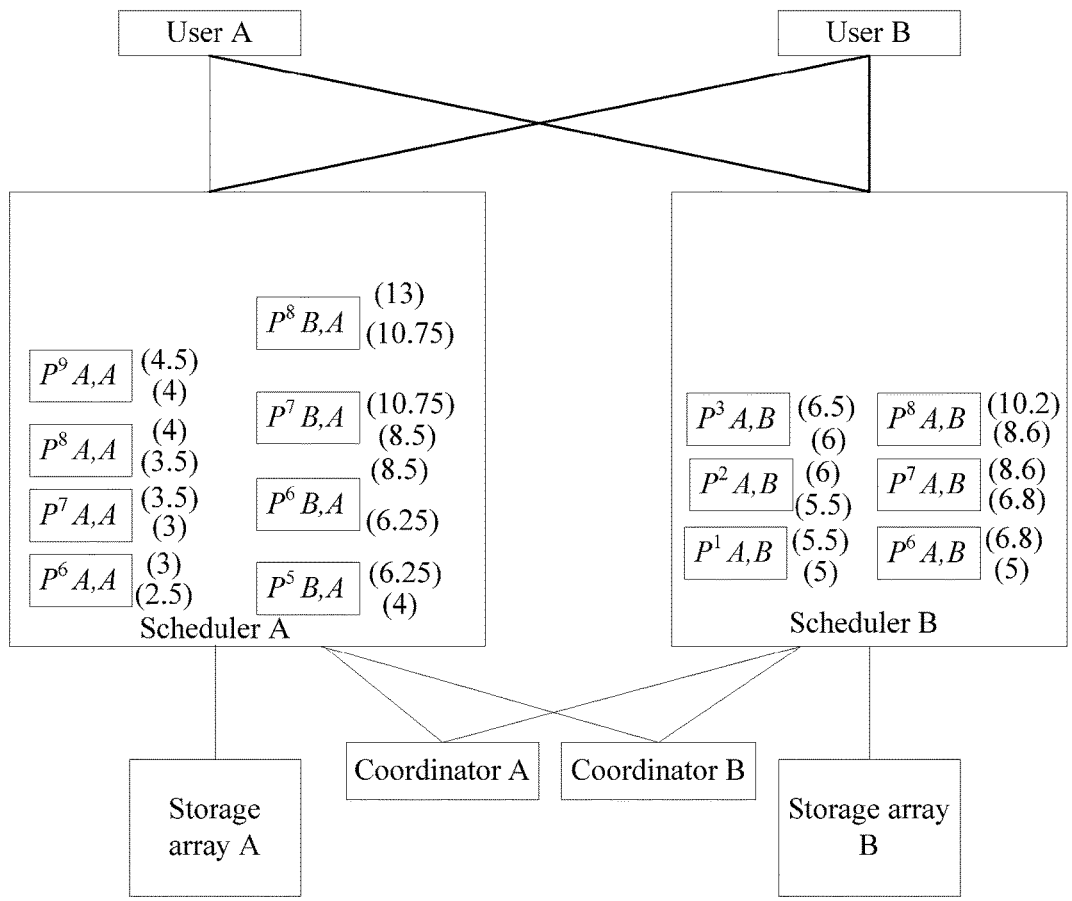
FIG. 8 is a schematic diagram of a status of a distributed resource system according to an embodiment of the present invention.

As shown in FIG. 8, in a $T_{n+2}$ period, the scheduler A receives the first user A request $P^6_{A,A}$, where a virtual start time of the $P^6_{A,A}$ is $S(P^6_{A,A})=\max\{v(P^6_{A,A}), F(P^5_{A,A})\}$, where $v(P^6_{A,A})=F(P^5_{A,A})=2.5$, and therefore, $$S(P^6_{A,A}) = 2.5 \cdot F(P^6_{A,A}) = S(P^6_{A,A}) + \frac{c(P^6_{A,A})}{\phi_A} + \frac{d(P_{A,A}(T_{n+2}))}{\phi_A},$$

where $$d(P_{A,A}(T_{n+2})) = \frac{C_A(T_{n+1}) - C_{A,A}(T_{n+1})}{N_{A,A}(T_{n+1})}$$

$$= \frac{C_{A,B}(T_{n+1})}{N_{A,A}(T_{n+1})},$$

and $C_{A,B}(T_{n+1})=0$ and $N_{A,A}(T_{n+1})=5$ in the $T_{n+1}$ period; then $d(P_{A,A}(T_{n+2}))=0$; $c(P^6_{A,A})=1$, $\phi_A=2$, and therefore, $F(P^6_{A,A})=3$. Likewise, a virtual start time of a $P^7_{A,A}$ is 3, and a virtual finish time of the $P^7_{A,A}$ is 3.5; a virtual start time of a $P^8_{A,A}$ is 3.5, and a virtual finish time of the $P^8_{A,A}$ is 4; and a virtual start time of a $P^9_{A,A}$ is 4, and a virtual finish time of the $P^9_{A,A}$ is 4.5.

In the $T_{n+2}$ period, the scheduler A receives the first user B request $P^5_{B,A}$, where $S(P^5_{B,A})=\max\{v(P^5_{B,A}), F(P^4_{B,A})\}$, $v(P^5_{B,A})=F(P^4_{B,A})=4$, and therefore, $S(P^5_{B,A})=4$. A virtual finish time of the $P^5_{B,A}$ is $$F(P^5_{B,A}) = S(P^5_{B,A}) + \frac{c(P^5_{B,A})}{\phi_B} + \frac{d(P_{B,A}(T_{n+2}))}{\phi_B},$$

where $c(P^5_{B,A})=1$, $$d(P_{B,A}(T_{n+2})) = \frac{C_B(T_{n+1}) - C_{B,A}(T_{n+1})}{N_{B,A}(T_{n+1})}$$

$$= \frac{C_{B,B}(T_{n+1})}{N_{B,A}(T_{n+1})},$$

$C_{B,B}(T_{n+1})=5$, $N_{B,A}(T_{n+1})=4$, $d(P_{B,A}(T_{n+2}))=1.25$, $\phi_B=1$, and therefore, $F(P^5_{B,A})=6.25$. Likewise, a virtual start time of a $P^6_{B,A}$ is 6.25, and a virtual finish time of the $P^6_{B,A}$ is 8.5; a virtual start time of a $P^7_{B,A}$ is 8.5, and a virtual finish time of the $P^7_{B,A}$ is 10.75; and a virtual start time of a $P^8_{B,A}$ is 10.75, and a virtual finish time of the $P^8_{B,A}$ is 13.

The scheduler A computes virtual start times and virtual finish times of the $P^6_{A,A}$, $P^7_{A,A}$, $P^8_{A,A}$, and $P^9_{A,A}$, and the scheduler A computes virtual start times and virtual finish times of the $P^5_{B,A}$, $P^6_{B,A}$, $P^7_{B,A}$, and $P^8_{B,A}$. According to the virtual start times of the user requests that are received by the scheduler A, the user requests are ranked in a scheduling queue in ascending order of the virtual start times for processing, that is, an order from the queue head to the queue tail in the scheduling queue is $P^6_{A,A}$, $P^7_{A,A}$, $P^8_{A,A}$, $P^9_{A,A}$, $P^5_{B,A}$, $P^6_{B,A}$, $P^7_{B,A}$, and $P^8_{B,A}$, as shown in FIG. 9. The storage array A processes the user requests in the order of $P^6_{A,A}$, $P^7_{A,A}$, $P^8_{A,A}$, $P^9_{A,A}$, $P^5_{B,A}$, $P^6_{B,A}$, $P^7_{B,A}$, and $P^8_{B,A}$.

In the $T_{n+2}$ period, the scheduler B receives the first user A request $P^1_{A,B}$ and the first user B request $P^6_{B,B}$. It is assumed that the scheduler B receives the $P^1_{A,B}$ and the $P^6_{B,B}$ at a same moment. A virtual start time of the $P^6_{B,B}$ is $S(P^6_{B,B})=\max\{v(P^6_{B,B}), F(P^5_{B,B})\}$, where $v(P^6_{B,B})=F(P^5_{B,B})=5$, and therefore, $S(P^6_{B,B})=5$. A virtual finish time of the $P^6_{B,B}$ is $$F(P^6_{B,B}) = S(P^6_{B,B}) + \frac{c(P^6_{B,B})}{\phi_B} + \frac{d(P_{B,B}(T_{n+2}))}{\phi_B},$$

where $$c(P^6_{B,B}) = 1,$$

$$d(P_{B,B}(T_{n+2})) = \frac{C_B(T_{n+1}) - C_{B,B}(T_{n+1})}{N_{B,B}(T_{n+1})} = \frac{C_{B,A}(T_{n+1})}{N_{B,B}(T_{n+1})} = \frac{4}{5} = 0.8,$$

and $\phi_B=1$, and therefore, $F(P^6_{B,B})=6.8$. Likewise, a virtual start time of a $P^7_{B,B}$ is 6.8, and a virtual finish time of the $P^7_{B,B}$ is 8.6; a virtual start time of a $P^8_{B,B}$ is 8.6, and a virtual finish time of the $P^8_{B,B}$ is 10.4. A virtual start time of the $P^1_{A,B}$ is $S(P^1_{A,B})=\max\{v(P^1_{A,B}), F(P^0_{A,B})\}$, where $F(P^0_{A,B})=0$ and $v(P^1_{A,B})=v(P^6_{B,B})=5$, and therefore, $S(P^1_{A,B})=5$. A virtual finish time of the $P^1_{A,B}$ is $$F(P^1_{A,B}) = S(P^1_{A,B}) + \frac{c(P^1_{A,B})}{\phi_B} + \frac{d(P_{A,B}(T_{n+2}))}{\phi_B},$$

where $c(P^1_{A,B})=1$, $$d(P_{A,B}(T_{n+2})) = \frac{C_A(T_{n+1}) - C_{A,B}(T_{n+1})}{N_{A,B}(T_{n+1})}$$

$$= \frac{C_{A,A}(T_{n+1})}{N_{A,B}(T_{n+1})},$$

$C_{A,A}(T_{n+1})=5$, and $N_{A,A}(T_{n+1})=0$; then $d(P_{A,B}(T_{n+2}))=0$, and $\phi_A=2$, and therefore, $F(P^1_{A,B})=5.5$. Likewise, a virtual start time of a $P^2_{A,B}$ is 5.5, and a virtual finish time of the $P^2_{A,B}$ is 6; and a virtual start time of a $P^3_{A,B}$ is 6, and a virtual finish time of the $P^3_{A,B}$ is 6.5.

The scheduler B adds the user requests to a scheduling queue, and the user requests are ranked in the scheduling queue in ascending order of the virtual start times, that is, an order from the queue head to the queue tail in the scheduling queue is $P^1_{A,B}$, $P^6_{B,B}$, $P^2_{A,B}$, $P^3_{A,B}$, $P^7_{B,B}$, and $P^8_{B,B}$, as shown in FIG. 10. The storage array B processes the user requests in the order of $P^1_{A,B}$, $P^6_{B,B}$, $P^2_{A,B}$, $P^3_{A,B}$, $P^7_{B,B}$, and $P^8_{B,B}$.

Figure 11:
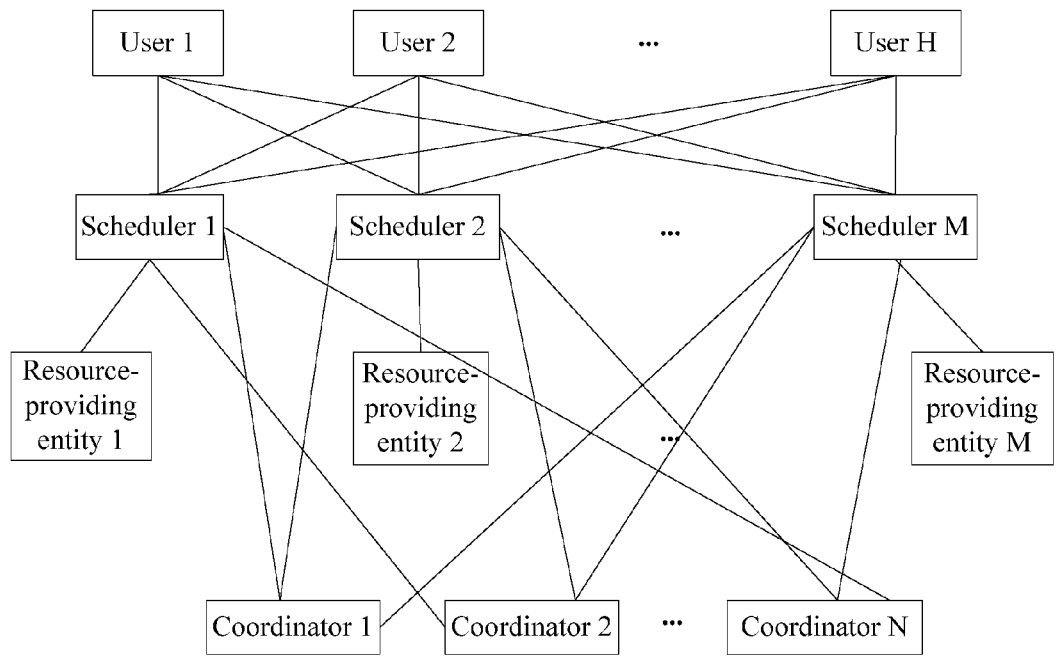
FIG. 11 is an architecture diagram of a distributed resource system according to an embodiment of the present invention.

The method for scheduling a user request in a distributed resource system provided by this embodiment of the present invention may be further applied to a scenario shown in FIG. 11, where the distributed resource system includes a user 1 to a user H, a scheduler $S_1$ to a scheduler $S_M$, a resource-providing entity $R_1$ to a resource-providing entity $R_M$, and a coordinator $G_1$ to a coordinator $G_Y$, where H is a natural number greater than or equal to 2, M is a natural number greater than or equal to 2, and Y is a natural number. A scheduler $S_x$ communicates with a resource-providing entity $R_x$, where x is any natural number from 1 to M. Any user z can send a user z request to any scheduler $S_x$. The $R_x$ provides a resource for a user request received by the $S_x$. The coordinator $G_y$ communicates with any $R_x$, where y is any natural number from 1 to Y, and a value of Y may be less than or equal to M, or may be greater than M. Y may also be 1, that is, there is only one coordinator in the distributed resource system. A quantity of coordinators may be determined according to a quantity of schedulers, or may be determined according to a quantity of users, which is not limited in this embodiment of the present invention. Any user z sends the $i^{th}$ user z request to a scheduler $S_d$ in a $T_{n+1}$ period, where i is a natural number, d is a natural number, $1 \leq d \leq M$, and $S_d$ indicates one of $S_1$ to $S_M$. When the $S_d$ needs to schedule the received user request, the following steps are performed:

Step 1201. The $S_d$ acquires, in the $T_{n+1}$ period and from a coordinator $G_k$ of a user z, a resource $C_z(T_n)$ that is consumed by the user z request in a $T_n$ period, where $$C_z(T_n) = \sum_{x=1}^{M} C_{z,x}(T_n);$$

d and k are natural numbers, $1 \leq d \leq M$, and $1 \leq k \leq Y$; a resource weight of the user z is $\phi_z$; $C_{z,x}(T_n)$ is a quantity of resources that are provided by the $R_x$ and consumed by $N_{z,x}(T_n)$ user z requests received by the $S_x$ in the $T_n$ period; z indicates an identifier of the user; and $$C_z(T_n) = \sum_{x=1}^{M} C_{z,x}(T_n)$$

indicates the sum of resources that are provided by the $R_1$ to the $R_M$ and consumed by user z requests received by the $S_1$ to the $S_M$ in the $T_n$ period.

In step 1201, $C_{z,x}(T_n)$ specifically includes the sum of resources that are provided by the $R_x$ and consumed by $N_{z,x}(T_n)$ user z requests received by the $S_x$ in the $T_n$ period. $N_{z,x}(T_n)$ indicates a quantity of user z requests that are received by the $S_x$ in the $T_n$ period. The $S_x$ sends $C_{z,x}(T_n)$ to a $G_k$, and the $G_k$ acquires $C_z(T_n)$ according to $$\sum_{x=1}^{M} C_{z,x}(T_n).$$

A manner of acquiring $C_z(T_n)$ is that the $S_x$ proactively sends $C_{z,x}(T_n)$ to the $G_k$. Another manner is that the $S_x$ receives a $G_k$ request, and sends $C_{z,x}(T_n)$ to the $G_k$ according to the $G_k$ request. The $G_k$ acquires $C_{z,x}(T_n)$ according to $$\sum_{x=1}^{M} C_{z,x}(T_n).$$

The $S_x$ stores $N_{z,x}(T_n)$ and $C_{z,x}(T_n)$.

Step 1202. The $S_d$ schedules, according to $\phi_z$, $C_z(T_n)$, $C_{z,d}(T_n)$, and $N_{z,d}(T_n)$, a $P^i_{z,d}$ by using a scheduling algorithm, where the $P^i_{z,d}$ is the $i^{th}$ user z request received by the $S_d$, and $C_{z,d}(T_n)$ is a quantity of resources that are provided by an $R_d$ and consumed by $N_{z,d}(T_n)$ user z requests received by the $S_d$ in the $T_n$ period.

The $S_d$ schedules, according to $\phi_z$, $C_z(T_n)$, $C_{z,d}(T_n)$, and $N_{z,d}(T_n)$, the $P^i_{z,d}$ by using a scheduling algorithm, thereby implementing global scheduling on the user z request and ensuring a performance requirement of the user z. Step 1202 specifically includes:

That the $S_d$ schedules, according to $\phi_z$, $C_z(T_n)$, $C_{z,d}(T_n)$, and $N_{z,d}(T_n)$, the $P^i_{z,d}$ by using a scheduling algorithm specifically includes that: the $S_d$ computes a virtual start time $S(P^i_{z,d})$ and a virtual finish time $F(P^i_{z,d})$ of the $P^i_{z,d}$ according to $\phi_z$, $C_z(T_n)$, $C_{z,d}(T_n)$, and $N_{z,d}(T_n)$ and adds the $P^i_{z,d}$ to a scheduling queue, where the scheduling queue ranks the user request according to a value of the virtual start time of the user request.

$$S(P^i_{z,d}) = \max\{v(P^i_{z,d}), F(P^{i-1}_{z,d})\},$$

$$F(P^i_{z,d}) = S(P^i_{z,d}) + \frac{c(P^i_{z,d})}{\phi_z} + \frac{d(P_{z,d}(T_{n+1})}{\phi_z}, \text{ and}$$

$$d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$; or, $$S(P^i_{z,d}) = \max\left\{v(P^i_{z,d}), F(P^{i-1}_{z,d}) + \frac{d(P_{z,d}(T_{n+1}))}{\phi_z}\right\},$$

$$F(P^i_{z,d}) = S(P^i_{z,d}) + \frac{c(P^i_{z,d})}{\phi_z}, \text{ and}$$

$$d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$.

For meanings of the virtual start time $S(P^i_{A,A})$ the virtual finish time $F(P^i_{A,A})$, and the virtual time $v(P^i_{A,A})$, refer to a Start-time Fairness Queuing (SFQ) algorithm, and details are not described in this embodiment of the present invention again.

$d(P_{z,d}(T_{n+1}))$ indicates a value of a delay of each $P^i_{z,d}$ received by the $S_d$ in the $T_{n+1}$ period.

When either of $C_z(T_n) - C_{z,d}(T_n)$ and $N_{z,d}(T_n)$ is 0, $d(P_{z,d}(T_{n+1}))=0$.

$c(P^i_{z,d})$ may be specifically an IOPS or bandwidth that is consumed by the $P^i_{z,d}$.

Step 1201 specifically includes:

the $G_k$ is determined according to z % Y=k, where z % Y indicates that a modulo operation is performed on z and Y; or the $G_k$ is determined according to Hash(z) % Y=k, where Hash(z) indicates that z is computed by using a hash function, and Hash(z) % Y indicates that a modulo operation is performed on a value and Y, where the value is obtained by computing z by using the hash function.

In the application scenario shown in FIG. 11, the $G_k$ is configured to send $C_z(T_n)$ to each scheduler $S_x$.

In the application scenario shown in FIG. 11, the method that the $S_d$ uses a scheduling algorithm to schedule the user z request is applicable to scheduling of any user request in the distributed resource system in this embodiment of the present invention. Requests of two or more users may be scheduled in the $S_d$.

In the application scenario shown in FIG. 11, the scheduler $S_d$ schedules, by using a scheduling algorithm, the user z request $P^i_{z,d}$ according to $C_z(T_n)$, $C_{z,d}(T_n)$, and $N_{z,d}(T_n)$ of the user z in the distributed resource system in the $T_n$ period, and with reference to the weight $\phi_z$ of the user, thereby implementing global scheduling on the user z request and ensuring a performance requirement of the user z.

In a system architecture in this embodiment of the present invention, the user z request can be scheduled without depending on a user agent.

In this embodiment of the present invention, that a resource is an IOPS is used as an example, and generally, one user request consumes one IOPS; or that a resource is network bandwidth is used as an example, and a resource that is consumed by one user request is network bandwidth for the user request. When a resource consumed by a user request is network bandwidth, a size of a resource that is provided by a resource-providing entity and consumed by each user request is determined by the user request.

In this embodiment of the present invention, scheduling a user request by using a scheduling algorithm includes: computing a virtual start time and a virtual finish time of the user request according to the scheduling algorithm in this embodiment of the present invention; and adding the user request to a scheduling queue, where the user request is ranked in the scheduling queue according to a value of the virtual start time of the user request. When it is not required to schedule the user request, the virtual start time and the virtual finish time of the user request need to be computed according to the scheduling algorithm in this embodiment of the present invention, and the user request does not need to be added to a scheduling queue for ranking.

In this embodiment of the present invention, $S_d$, $S_x$, $R_x$, $G_y$, and $G_k$ are merely used to mark a specific device each, where the device herein may be a physical device or a logical device. Likewise, a device may also be expressed in a manner of first, second, and the like. There is only a difference in specific expression manners, which does not impose a limitation on the solution of the present invention.

Figure 12:
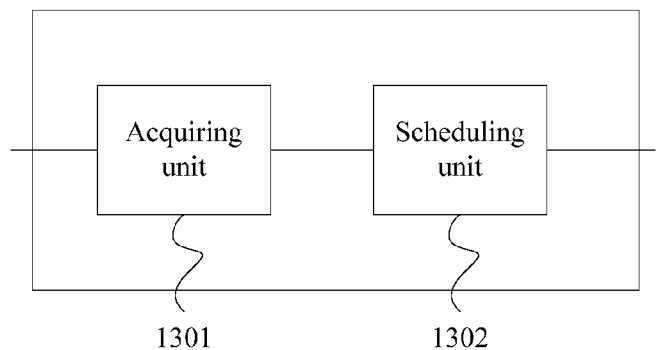
FIG. 12 is a schematic structural diagram of a scheduler according to an embodiment of the present invention.

As shown in FIG. 12, an embodiment of the present invention provides a scheduler $S_d$. The scheduler $S_d$ is applied to a distributed resource system, where the distributed resource system includes schedulers $S_x$, resource-providing entities $R_x$, and a coordinator $G_y$, where x is any one of consecutive natural numbers from 1 to M, and M≥2; d is a number in x; y is any one of consecutive natural numbers from 1 to Y; the $S_x$ communicates with the $R_x$; the $G_y$ communicates with any $S_x$; and the scheduler $S_d$ includes an acquiring unit 1301 and a scheduling unit 1302, where:

the acquiring unit 1301 is configured to acquire, in a $T_{n+1}$ period and from a coordinator $G_k$ of a user z, a resource $C_z(T_n)$ that is consumed by a user z request in a $T_n$ period, where $$C_z(T_n) = \sum_{x=1}^{M} C_{z,x}(T_n);$$

k is a natural number, and $1 \leq k \leq Y$; a resource weight of the user z is $\phi_z$; $C_{z,x}(T_n)$ is a quantity of resources that are provided by the $R_x$ and consumed by $N_{z,x}(T_n)$ user z requests received by the $S_x$ in the $T_n$ period; and z indicates an identifier of the user; and the scheduling unit 1302 is configured to schedule, according to $\phi_z$, $C_z(T_n)$, $C_{z,d}(T_n)$, and $N_{z,d}(T_n)$, a $P^i_{z,d}$ by using a scheduling algorithm, where the $P^i_{z,d}$ is the $i^{th}$ user z request received by the $S_d$, and $C_{z,d}(T_n)$ is a quantity of resources that are provided by an $R_d$ and consumed by $N_{z,d}(T_n)$ user z requests received by the $S_d$ in the $T_n$ period.

Specifically, that the scheduling unit 1302 is configured to schedule, according to $\phi_z$, $C_z(T_n)$, $C_{z,d}(T_n)$, and $N_{z,d}(T_n)$, a $P^i_{z,d}$ by using a scheduling algorithm specifically includes:

computing a virtual start time $S(P^i_{z,d})$ and a virtual finish time $F(P^i_{z,d})$ of the $P^i_{z,d}$ according to $\phi_z$, $C_z(T_n)$, $C_{z,d}(T_n)$, and $N_{z,d}(T_n)$; and adding the $P^i_{z,d}$ to a scheduling queue, where the scheduling queue ranks the user request according to a value of the virtual start time of the user request.

Specifically, $S(P^i_{z,d}) = \max\{v(P^i_{z,d}), F(P^{i-1}_{z,d})\}$, $$F(P^i_{z,d}) = S(P^i_{z,d}) + \frac{c(P^i_{z,d})}{\phi_z} + \frac{d(P_{z,d}(T_{n+1}))}{\phi_z}, \text{ and}$$

$$d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$.

Specifically, $S(P^i_{z,d}) = \max\{v(P^i_{z,d}),$ $$F(P^{i-1}_{z,d}) + \frac{d(P_{z,d}(T_{n+1}))}{\phi_z}\}, F(P^i_{z,d}) = S(P^i_{z,d}) + \frac{c(P^i_{z,d})}{\phi_z}, \text{ and}$$

$$d(P_{z,d}(T_{n+1})) = \frac{C_z(T_n) - C_{z,d}(T_n)}{N_{z,d}(T_n)},$$

where $v(P^i_{z,d})$ indicates a virtual time of the $S_d$ when the $S_d$ receives the $P^i_{z,d}$, and $c(P^i_{z,d})$ indicates a resource that is provided by the $R_d$ and consumed by the $P^i_{z,d}$.

For meanings of the virtual start time $S(P^i_{A,A})$ the virtual finish time $F(P^i_{A,A})$, and the virtual time $v(P^i_{A,A})$, refer to a Start-time Fairness Queuing (SFQ) algorithm, and details are not described in this embodiment of the present invention again.

Specifically, when either of $C_z(T_n) - C_{z,d}(T_n)$ and $N_{z,d}(T_n)$ is 0, $d(P_{z,d}(T_{n+1})) = 0$.

The $S_d$ schedules, according to $\phi_z$, $C_z(T_n)$, $C_{z,d}(T_n)$ the $P^i_{z,d}$ by using the scheduling algorithm. The user z request can be scheduled without depending on a user agent. In addition, the $S_d$ schedules, according to $\phi_z$, $C_z(T_n)$, $C_{z,d}(T_n)$, and $N_{z,d}(T_n)$, the $P^i_{z,d}$ by using the scheduling algorithm, thereby implementing global scheduling on the user z request and ensuring a performance requirement of the user z.

In an implementation manner of another resource scheduling method in a distributed resource system, the distributed resource system includes multiple schedulers, where a first scheduler in the multiple schedulers acquires, from a coordinator of a first user, the sum of resources that are consumed by a user request of the first user in the multiple schedulers in a previous period; and the first scheduler schedules the user request of the first user according to a resource weight of the first user, the sum of resources that are consumed by the user request of the first user in the multiple schedulers in the previous period, a resource that is consumed by the user request of the first user in the first scheduler in the previous period, and a quantity of user requests of the first user received by the first scheduler in the previous period.

Further, that the first scheduler schedules the user request of the first user according to a resource weight of the first user, the sum of resources that are consumed by the user request of the first user in the multiple schedulers in the previous period, a resource that is consumed by the user request of the first user in the first scheduler in the previous period, and a quantity of user requests of the first user received by the first scheduler in the previous period specifically includes that:

the first scheduler computes a virtual start time and a virtual finish time of the user request of the first user according to the resource weight of the first user, the sum of resources that are consumed by the user request of the first user in the multiple schedulers in the previous period, the resource that is consumed by the user request of the first user in the first scheduler in the previous period, and the quantity of user requests of the first user received by the first scheduler in the previous period; and adds the user request of the first user to a scheduling queue, where the scheduling queue ranks the user request of the first user according to a value of the virtual start time of the user request.

Another distributed resource system includes multiple schedulers. As shown in FIG. 12, a first scheduler in the multiple schedulers includes an acquiring unit 1301 and a scheduling unit 1302, where:

the first acquiring unit 1301 is configured to acquire, from a coordinator of a first user, the sum of resources that are consumed by a user request of the first user in the multiple schedulers in a previous period; and the scheduling unit 1302 is configured to schedule the user request of the first user according to a resource weight of the first user, the sum of resources that are consumed by the user request of the first user in the multiple schedulers in the previous period, a resource that is consumed by the user request of the first user in the first scheduler in the previous period, and a quantity of user requests of the first user received by the first scheduler in the previous period.

Further, the scheduling unit 1302 is specifically configured to compute a virtual start time and a virtual finish time of the user request of the first user according to the resource weight of the first user, the sum of resources that are consumed by the user request of the first user in the multiple schedulers in the previous period, the resource that is consumed by the user request of the first user in the first scheduler in the previous period, and the quantity of user requests of the first user received by the first scheduler in the previous period; and add the user request of the first user to a scheduling queue, where the scheduling queue ranks the user request of the first user according to a value of the virtual start time of the user request.

The technical solutions provided by the embodiments of the present invention may also be applied to another scenario. For example, a distributed resource system is a distributed computing system, and a resource-providing entity provides a computing resource for a user request; or, a distributed resource system may be a distributed network system, and a resource-providing entity provides network bandwidth for a user request; or, a resource-providing entity may further provide a memory resource for a user request.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable non-volatile storage medium. Based on such an understanding, the technical solutions of the present invention essentially, or the part contributing to the prior art, or some of the technical solutions may be implemented in a form of a software product. The software product is stored in a non-volatile storage medium, and includes several instructions for instructing a computer device (which may be a personal computer, a server, or a network device) to perform all or some of the steps of the methods described in the embodiments of the present invention. The foregoing non-volatile storage medium includes: any medium that can store program code, such as a USB flash drive, a removable hard disk, a read-only memory (Read-Only Memory, ROM), a magnetic disk, or an optical disc.

What is claimed is:

1. A resource scheduling method in a distributed resource system, wherein the distributed resource system comprises multiple schedulers;
    a first scheduler in the multiple schedulers acquiring, from a coordinator of a first user, a sum of resources that are consumed in the multiple schedulers by a previous user request of the first user in a previous period; and
    the first scheduler scheduling a present user request of the first user in a present period according to a resource weight of the first user, the sum of resources that are consumed in the multiple schedulers by the previous user request of the first user in the previous period, a resource that is consumed in the first scheduler by the previous user request of the first user in the previous period, and a quantity of previous user requests of the first user received by the first scheduler in the previous period;
    the first scheduler computing, according to the resource weight of the first user, the sum of resources that are consumed in the multiple schedulers by the previous user request of the first user in the previous period, the resource that is consumed in the first scheduler by the previous user request of the first user in the previous period, and the quantity of the previous user requests of the first user received by the first scheduler in the previous period;
    the first scheduler computing a virtual start time and a virtual finish time of the present user request of the first user in the present period; and
    the first scheduler adding the present user request of the first user in the present period to a scheduling queue, wherein the scheduling queue ranks the present user request of the first user in the present period according to a value of the virtual start time of the present user request in the present period.

2. A first scheduler in a distributed resource system comprising multiple schedulers, the first scheduler comprising a central processing unit and a memory, wherein the central processing unit (CPU) executes an executable instruction in the memory to perform the following steps:
    acquiring, from a coordinator of a first user, a sum of resources that are consumed in the multiple schedulers by a previous user request of the first user in a previous period; and
    scheduling a present user request of the first user in a present period according to a resource weight of the first user, the sum of resources that are consumed in the multiple schedulers by the previous user request of the first user in the previous period, a resource that is consumed in the first scheduler by the previous user request of the first user in the previous period, and a quantity of previous user requests of the first user received by the first scheduler in the previous period;
    computing, according to the resource weight of the first user, the sum of resources that are consumed in the multiple schedulers by the previous user request of the first user in the previous period, the resource that is consumed in the first scheduler by the previous user request of the first user in the previous period, and the quantity of the previous user requests of the first user received by the first scheduler in the previous period;
    computing a virtual start time and a virtual finish time of the present user request of the first user in the present period; and
    adding the present user request of the first user in the present period to a scheduling queue;
    wherein the scheduling queue ranks the present user request of the first user in the present period according to a value of the virtual start time of the present user request in the present period.

3. A distributed resource system, wherein the distributed resource system comprises multiple schedulers,
    a coordinator, comprising a central processing unit and a memory, for a first user is configured to provide to a first scheduler in the multiple schedulers, a sum of resources that are consumed in the multiple schedulers by a previous user request of the first user in a previous period;
    the first scheduler comprising a central processing unit and a memory is configured to:

acquire, from the coordinator of the first user, the sum of resources that are consumed in the multiple schedulers by the previous user request of the first user in the previous period; and schedule a present user request of the first user in a present period according to a resource weight of the first user, the sum of resources that are consumed in the multiple schedulers by the previous user request of the first user in the previous period, a resource that is consumed in the first scheduler by the previous user request of the first user in the previous period, and a quantity of previous user requests of the first user received by the first scheduler in the previous period;

compute, according to the resource weight of the first user, the sum of resources that are consumed in the multiple schedulers by the previous user request of the first user in the previous period, the resource that is consumed in the first scheduler by the previous user request of the first user in the previous period, and the quantity of the previous user requests of the first user received by the first scheduler in the previous period;

compute a virtual start time and a virtual finish time of the present user request of the first user in the present period; and add the present user request of the first user in the present period to a scheduling queue, wherein the scheduling queue ranks the present user request of the first user in the present period according to a value of the virtual start time of the present user request in the present period.

* * * * *

UNITED STATES PATENT AND TRADEMARK OFFICE
CERTIFICATE OF CORRECTION

PATENT NO. : 10,127,079 B2
APPLICATION NO. : 15/391643
DATED : November 13, 2018
INVENTOR(S) : Huarong Zeng Page 1 of 1

It is certified that error appears in the above-identified patent and that said Letters Patent is hereby corrected as shown below:

On the Title Page

(73) Assignee:
Delete "HUAWEI TECHNOLOGIES CO., LTD., Shenzhen (JP)" and insert --HUAWEI TECHNOLOGIES CO., LTD., Shenzhen (CN)--.

Signed and Sealed this
Eighteenth Day of June, 2019

Andrei Iancu
*Director of the United States Patent and Trademark Office*